(12) United States Patent
Sakaguchi

(10) Patent No.: US 6,816,287 B1
(45) Date of Patent: Nov. 9, 2004

(54) IMAGE READING APPARATUS AND FOCUSING CONTROL METHOD

(75) Inventor: Yasunobu Sakaguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/357,085

(22) Filed: Jul. 19, 1999

(30) Foreign Application Priority Data

Jul. 17, 1998 (JP) .......................................... 10-203869

(51) Int. Cl.[7] .................................................. H04N 1/04
(52) U.S. Cl. ....................... 358/474; 358/496; 358/497; 358/453; 382/169; 348/345
(58) Field of Search ................................. 358/474, 497, 358/505, 500, 453, 488, 487, 496; 382/169, 255; 348/345

(56) References Cited

U.S. PATENT DOCUMENTS

| | | | | |
|---|---|---|---|---|
| 5,335,093 A | * | 8/1994 | Imoto | 358/487 |
| 5,991,010 A | * | 11/1999 | Nishio | 355/82 |
| 6,088,084 A | * | 7/2000 | Nishio | 355/75 |
| 6,183,933 B1 | * | 2/2001 | Ichi | 430/256 |
| 6,359,706 B1 | * | 3/2002 | Arita | 358/486 |

* cited by examiner

*Primary Examiner*—Kimberly Williams
*Assistant Examiner*—Negussie Worku
(74) *Attorney, Agent, or Firm*—Sughrue Mion, PLLC

(57) ABSTRACT

An image reading apparatus is obtained which allows reading of an image in a short time and further allows setting of a focused state which is effective for warping caused in a main scan direction of an original to be read. Respective focusing positions in regions located in vicinities of both ends, in the main scan direction, of a main subject region in a film image on a photographic film, and in a region including the center of the film in the main scan direction are each detected as a virtual focusing position, and based on the detected virtual focusing positions, a final focusing position is determined.

19 Claims, 30 Drawing Sheets

F I G. 2
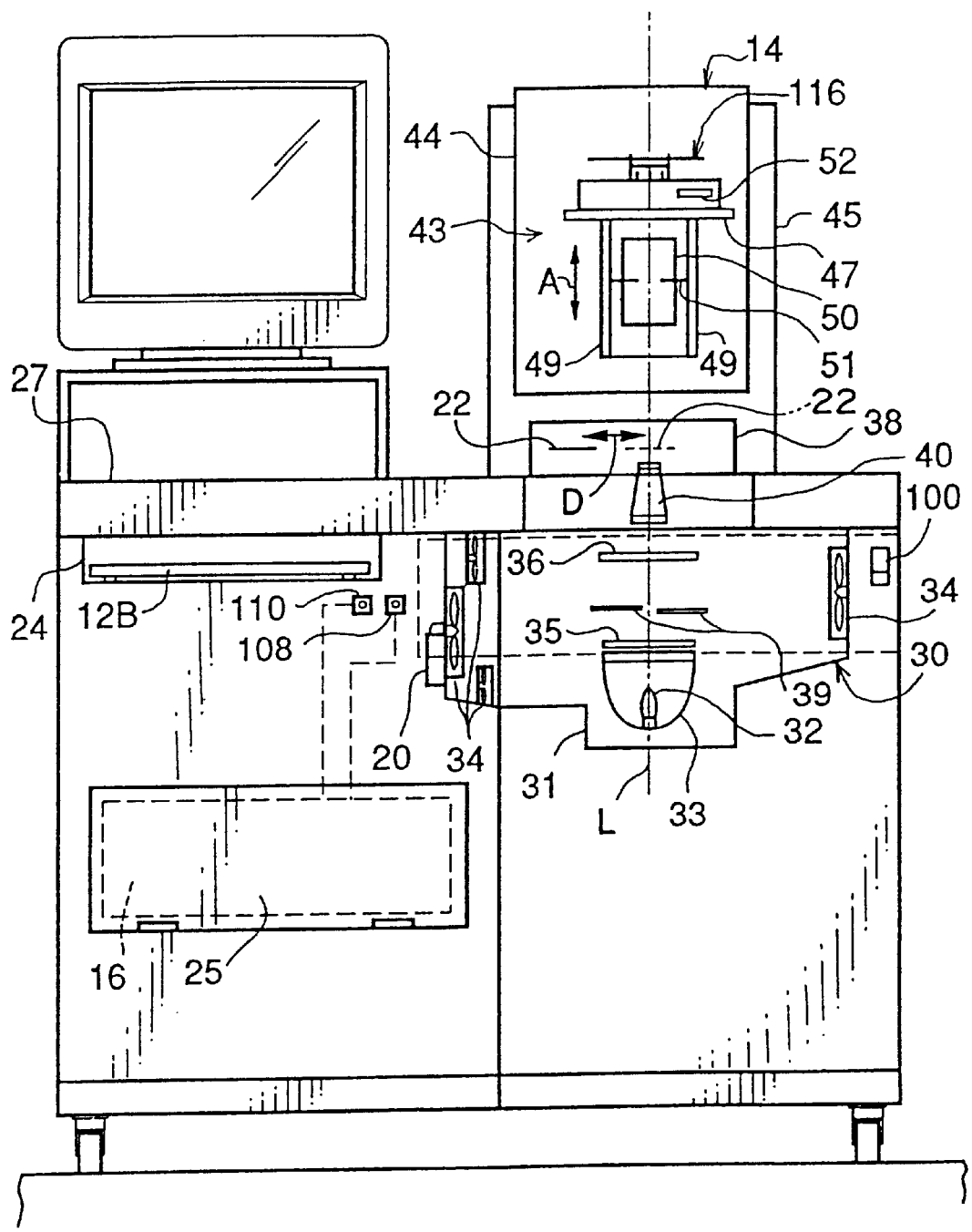

F I G. 5
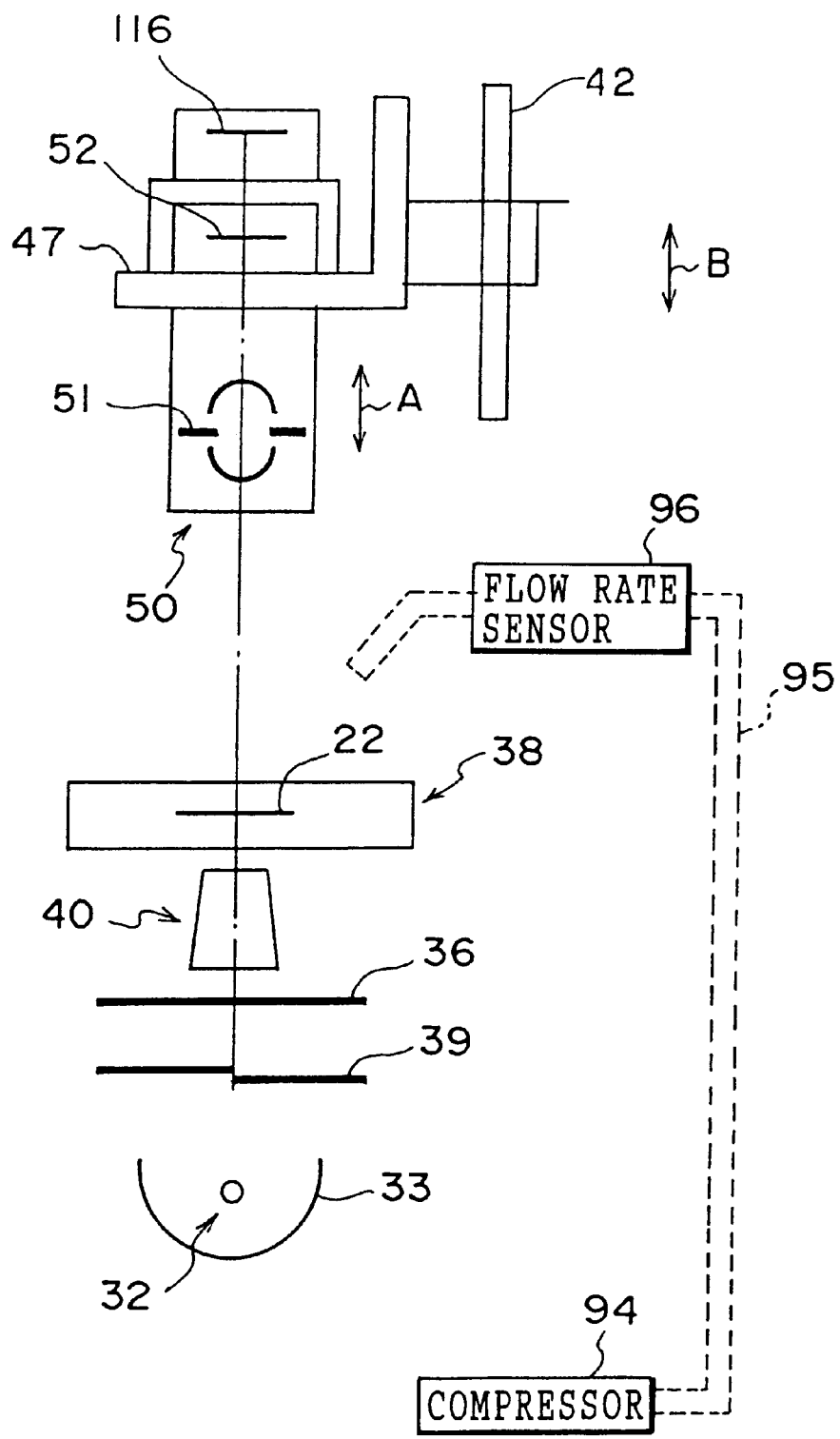

F I G. 8
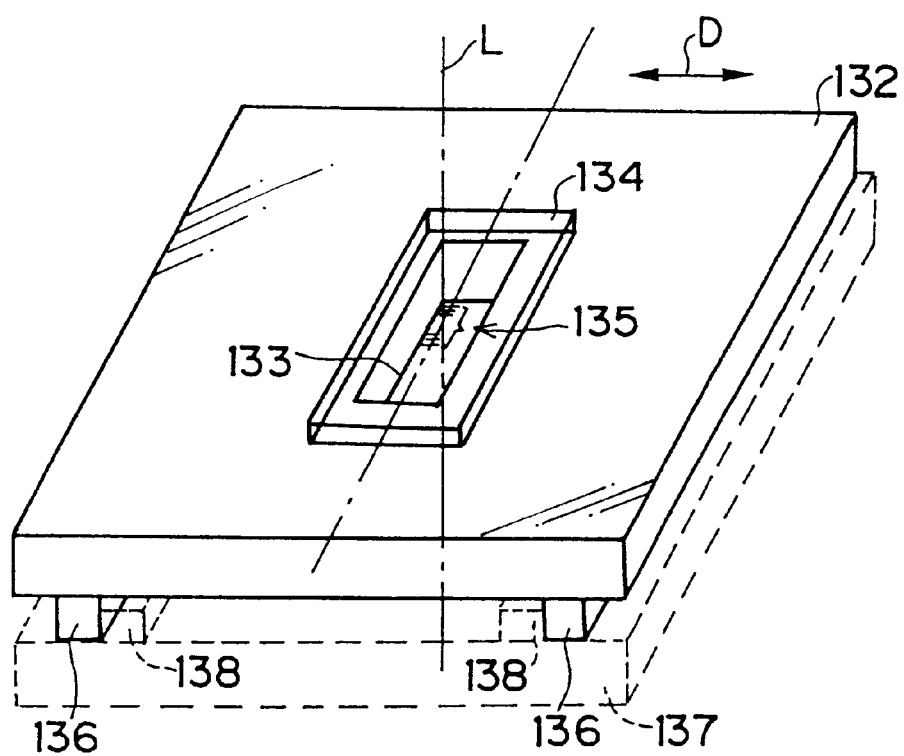

F I G. 1 1
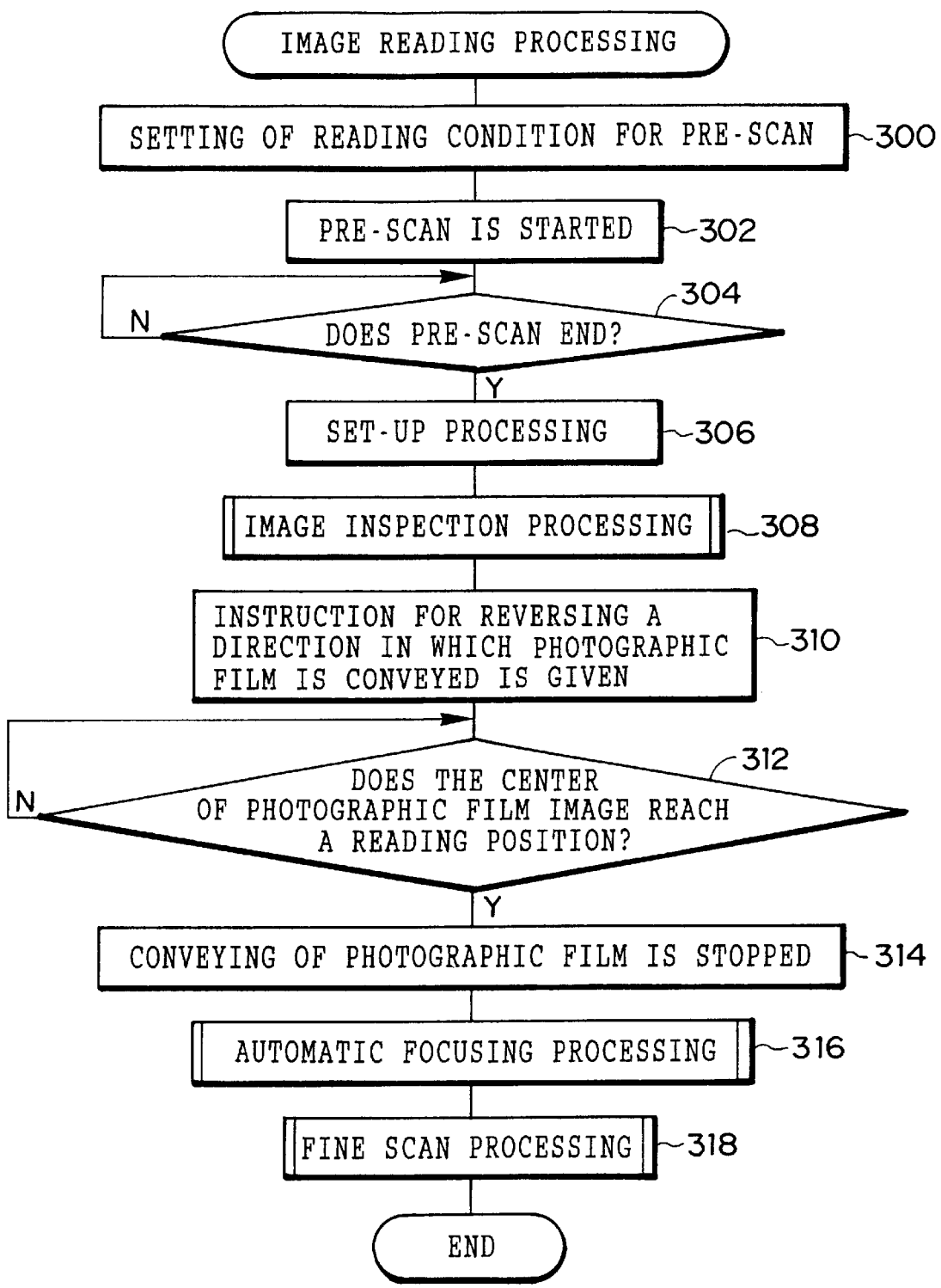

F I G. 1 2
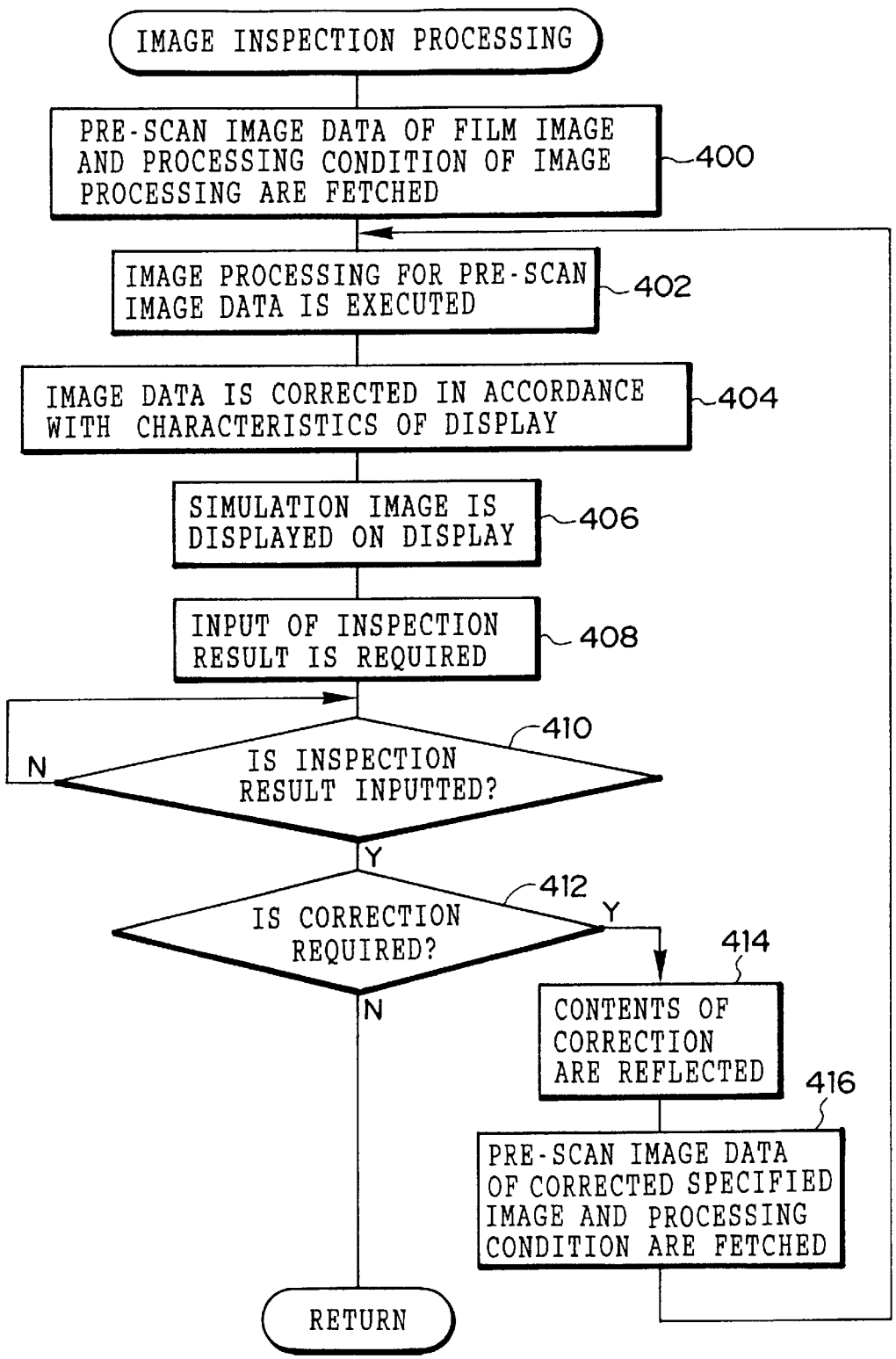

F I G. 1 3
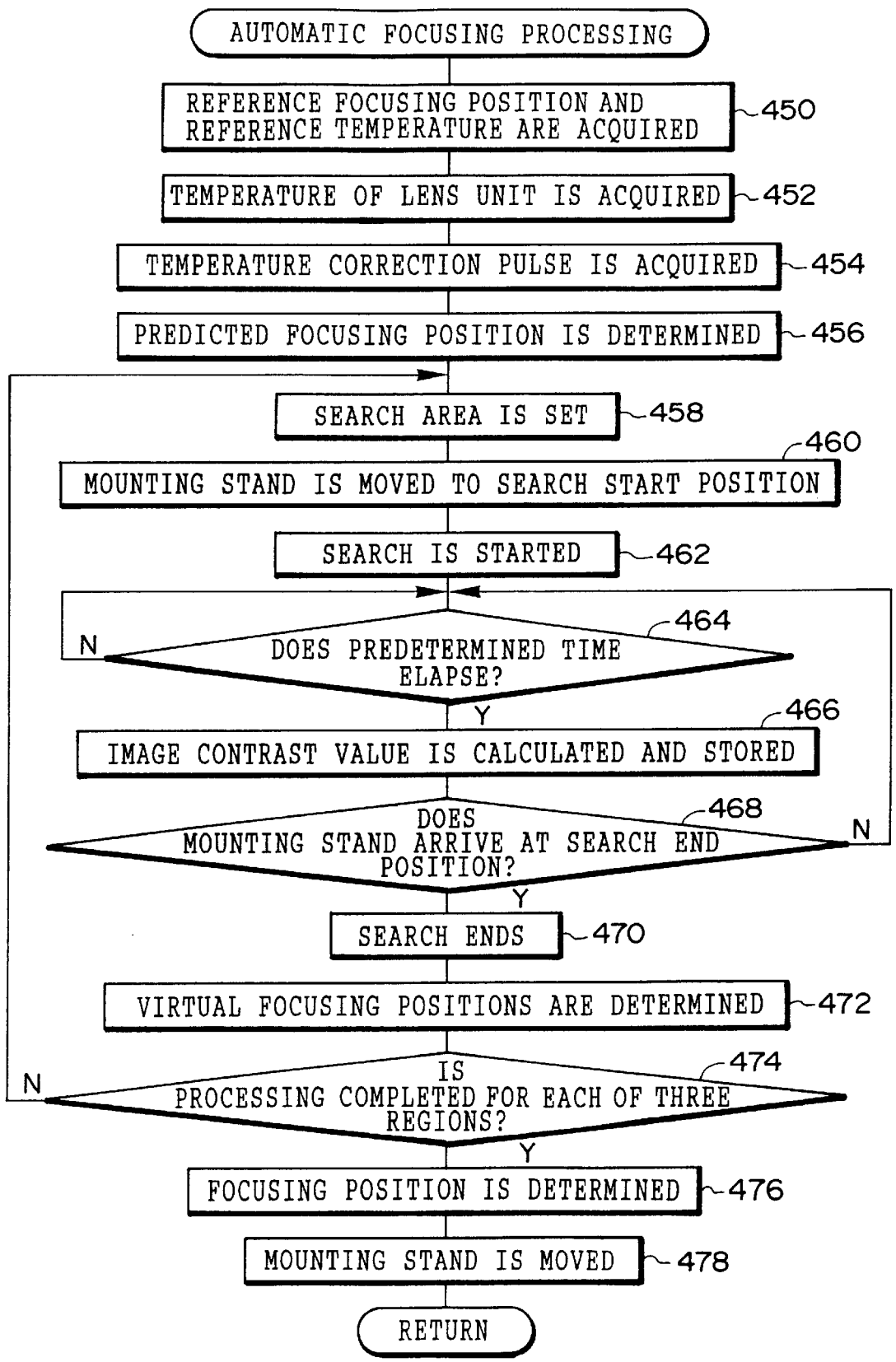

F I G. 1 5
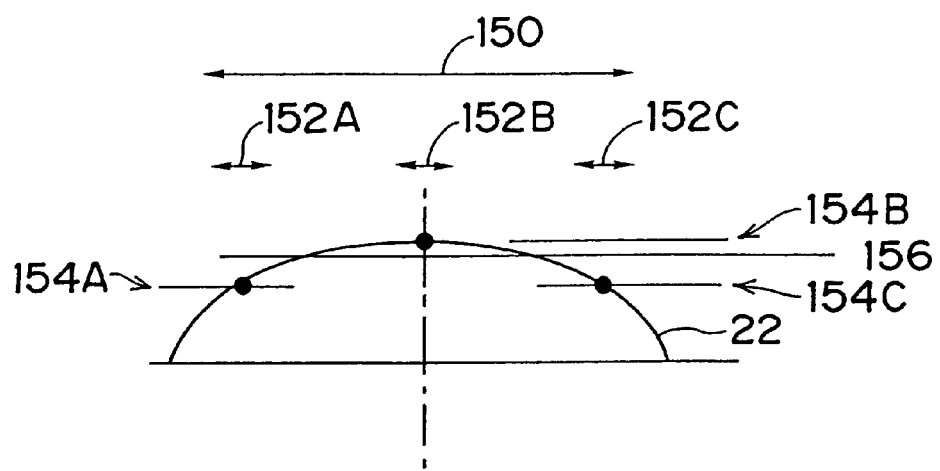

F I G. 1 6
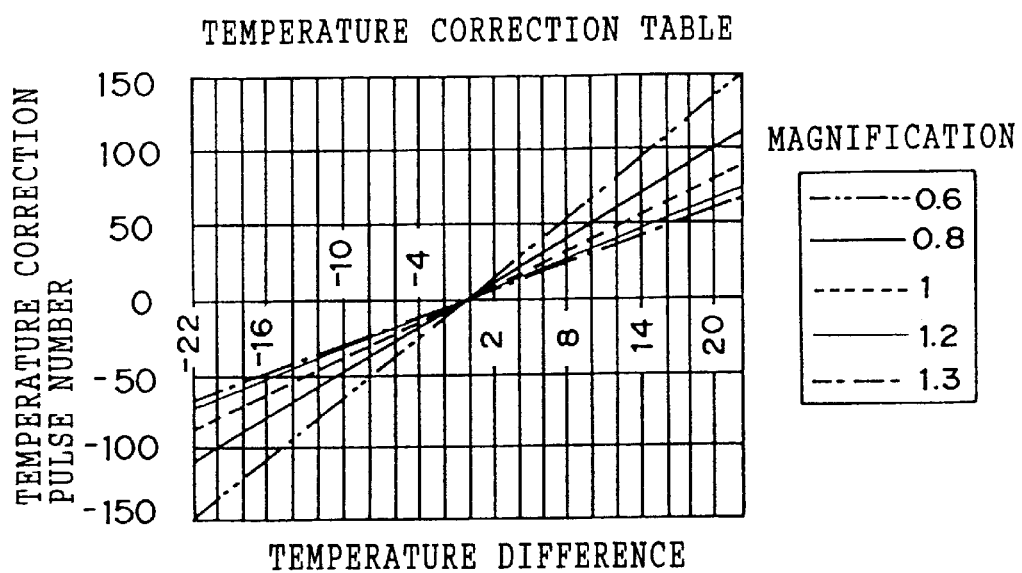

F I G. 1 7
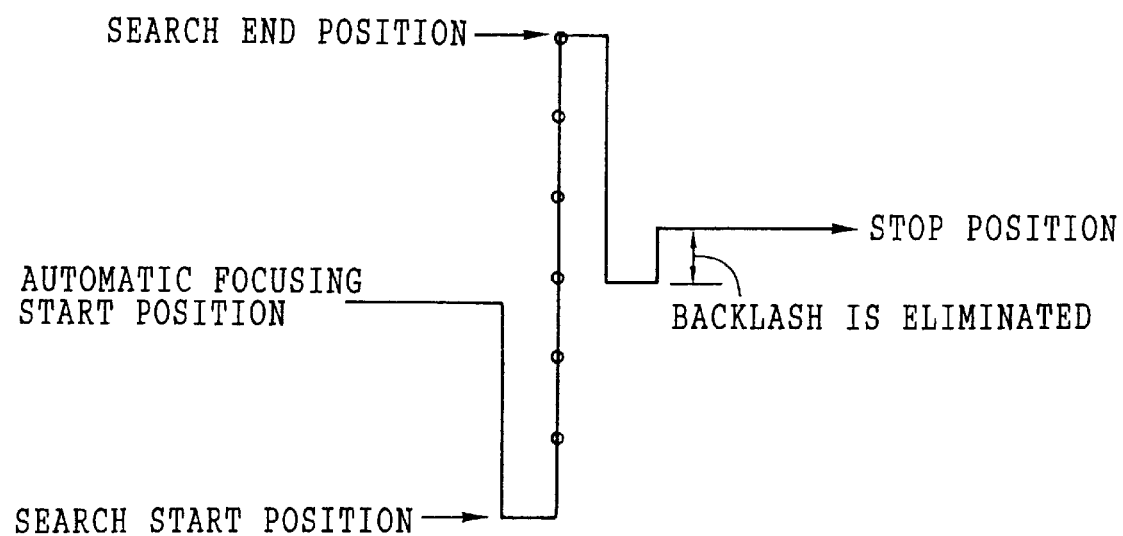

F I G. 2 7 A
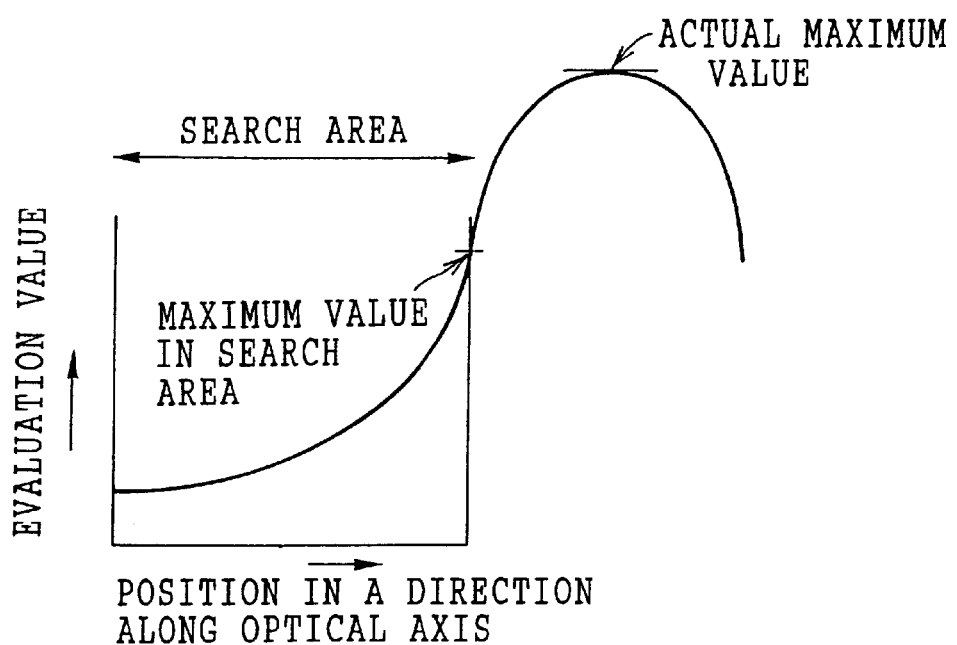
F I G. 2 7 B
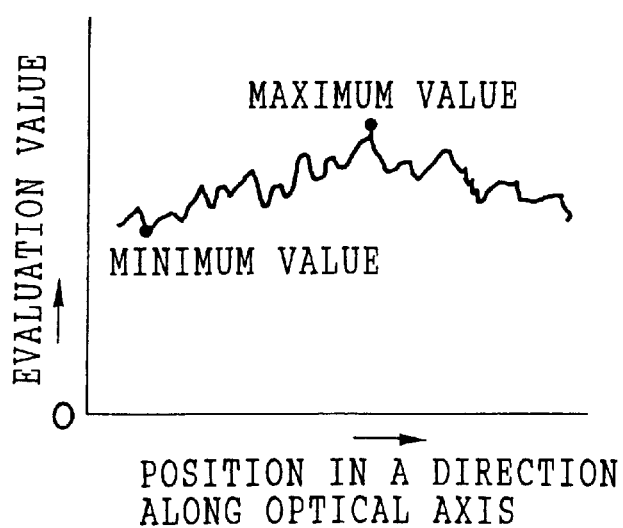

IMAGE READING APPARATUS AND FOCUSING CONTROL METHOD

BACKGROUND OF THE INVENTION

1. Field of the Invention

The present invention relates to an image reading apparatus and a focusing control method, and particularly to an image reading apparatus for reading images of an original to be read, such as a photographic film, on which images are recorded, and to a focusing control method applied to the image reading apparatus.

2. Description of the Related Art

There has conventionally been known an image processing system in which film images recorded on a photographic film are read by an image reading apparatus including image-formation means, an image sensor, and the like, and image processing such as various corrections is effected for image data obtained by the aforementioned reading, and thereafter, an image is recorded on a recording material or displayed on a display. The photographic film as mentioned herein is a film in which negative or positive images are made visible by development processing after the photographing of a subject thereon.

Some image reading apparatuses used by this type of image processing system allow reading of a so-called slide in which a photographic film is held on a film mount provided for each kind of photographic film. In such image reading apparatuses, in order to obtain image data of high quality, automatic focusing control is performed for a film image of a slide to be read so that a position at which an image is formed by image-formation means and a position at which light is received by an image sensor coincide with each other.

However, a photographic film is generally apt to be warped, and therefore, there are many cases in which a photographic film is warped even in a state of being held on a film mount. When automatic focusing control is performed for such a warped photographic film, although an optimal automatic focused state can be set for a specified position of a film image, focusing cannot be made at other positions.

A technique which can be applied to solve the above-described problem is disclosed in Japanese Patent Application Laid-Open (JP-A) No. 4-198929: in an image reading apparatus, comprising a line CCD as an image sensor, which repeats reading image corresponding to one line along a main scan direction (that is, a direction in which pixels of the line CCD are arranged) of film image, and synchronously with the reading of image moving a photographic film in a sub-scan direction by a distance corresponding to one line, to thereby allow reading of one image, prior to reading of film image, focusing positions at a plurality of positions located in the sub-scan direction of the film image are detected, and thereafter, based on the focusing positions, focusing positions between the plurality of positions are each calculated by approximation or interpolation, and when reading of film images is performed, each time the film images are moved in the sub-scan direction, focal adjustment in which image-formation means and the image sensor are moved to obtain the previously calculated focusing positions at the plurality of positions on the film image in the sub-scan direction is repeatedly performed, to thereby maintain constantly a focused state of the photographic film with respect to the sub-scan direction.

However, in the technique disclosed in JP-A No. 4-198929, the focused state is set each time the photographic film is moved in the sub-scan direction. Accordingly, there are drawbacks in that the time required for reading an image becomes longer, and although an effect is obtained for warping caused in the sub-scan direction of the photographic film, an effect is not obtained for warping caused in the main scan direction thereof.

SUMMARY OF THE INVENTION

The present invention has been devised in order to settle the above-described drawbacks and an object thereof is to provide an image reading apparatus which allows reading of image in a short time and setting of a focused state which is effective for warping caused in a main scan direction of an original to be read.

In order to achieve the above-described object, in accordance with a first aspect of the present invention, there is provided an image reading apparatus comprising:

a light source which illuminates an original to be read, on which an image is recorded;

image-formation means which allows one of light transmitted through the original to be read or light reflected by the original to be read, to form an image;

an image sensor which reads the image recorded on the original to be read and outputs read image as image data;

moving means for moving at least one of at least a portion of said image-formation means, said image sensor, and the original to be read in a direction along an optical axis of said image-formation means; and control means which, based on a plurality of focusing positions obtained by controlling said moving means so that focusing control which allows a position where an image is formed by said image-formation means and a position of said image sensor to coincide with each other is effected for a plurality of regions of the image, obtains a final focusing position, and which controls said moving means so that at least one of at least a portion of said image-formation means, said image sensor, and the original to be read moves to a position based on the final focusing position.

In accordance with the image reading apparatus of the first aspect of the present invention, the original to be read on which the image is recorded is illuminated by the light source, light transmitted through the original to be read or light reflected by the original to be read is allowed to form an image by the (optical) image-formation means, and the image recorded on the original to be read is read by the image sensor in a state of being separated into a plurality of pixels and further outputted as image data. The aforementioned original to be read includes a transparent original such as a photographic film, and a reflection original such as a photographic print. Further, the image sensor includes a line CCD, an area CCD, and a photoelectric element other than CCD.

Further, the image reading apparatus of the first aspect includes the moving means for moving at least one of at least a portion of the image-formation means, the image sensor, and the original to be read in the direction along the optical axis of the image-formation means. Based on the plurality of focusing positions obtained by controlling the moving means so that automatic focusing control in which the position where an image is formed by the image-formation means and the position of the image sensor coincides with each other is performed for the plurality of regions of the image, the final focusing position is obtained by the control means. The moving means is controlled by the control means so that at least one of at least a portion of the image-formation means, the image sensor, and the original to be read moves to the position based on the final focusing position.

As the aforementioned image-formation means, a lens or a lens group can be used. Alternatively, a zoom lens whose magnification can be varied by moving a part of lenses may also be used. When a lens or a lens group is used, the entire image-formation means is moved, and when a zoom lens is used, a portion of the image-formation means is moved.

As described above, according to the image reading apparatus of the first aspect, the final focusing position is obtained based on the plurality of focusing positions for the plurality of regions of the image recorded on the original to be read, and at least one of at least a portion of the image-formation means, the image sensor, and the original to be read is located at the position based on the final focusing position. Accordingly, setting of a focused state suitable for each of the plurality of regions in the image becomes possible. Even when warping is caused in the original to be read, a focused state which is effective for warping, in the main scan direction, of the original to be read can be set with the aforementioned plurality of regions being located along the main scan direction of the original to be read, and a focused state which is effective for warping, in a sub-scan direction, of the original to be read can be set with the aforementioned plurality of regions being located along the sub-scan direction of the original to be read. Further, reading of the image is allowed only based on the determined final focusing position. As a result, the reading of the image is allowed in an extremely short time as compared with a case in which automatic focusing control is performed each time the original to be read is moved in the sub-scan direction.

An image reading apparatus according to a second aspect of the present invention is characterized in that, in the image reading apparatus of the first aspect, in order that a region of a main subject recorded on the image be included in a range of the depth of field of said image-formation means when said control means controls said moving means so that at least one of at least a portion of said image-formation means, said image sensor, and the original to be read moves to the position based on the final focusing position, said control means obtains the final focusing position based on the plurality of focusing positions and the depth of field.

According to the image reading apparatus of the second aspect, such that the region of the main subject recorded on the image is included in the range of the depth of field of the image-formation means, when the moving means is controlled so that at least one of at least a portion of the image-formation means, the image sensor, and the original to be read is moved to the position based on the final focusing position, the final focusing position is obtained by the control means provided in the image reading apparatus of the first aspect on the basis of the plurality of focusing positions and the aforementioned depth of field.

As described above, according to the image reading apparatus of the second aspect, the same effect as that of the first aspect can be obtained, and further, the final focusing position is obtained based on the plurality of focusing positions and the aforementioned depth of field so that the region of a main subject recorded on the image is included in the range of depth of field of the image-formation means. Accordingly, a focused state suitable for an image corresponding to the region of a main subject can be set.

An image reading apparatus according to a third aspect of the present invention is characterized in that, in the image reading apparatus of the first or second aspect, said control means obtains the plurality of focusing positions based on a smoothed value of respective image contrast values at a plurality of positions in the plurality of regions.

According to the image reading apparatus of the third aspect, the aforementioned plurality of focusing positions are obtained based on the smoothed value of respective image contrast values at the plurality of positions in the above-described plurality of regions by the control means provided in the image reading apparatus according to the first or second aspect.

That is, as is well known, the focusing position can be obtained by detecting a position having the maximum image contrast value (a so-called image contrast approach). However, in a case in which the image reading apparatus of the present invention is used in a state of being installed at, for example, a position where vibration is apt to be generated, when a large vibration is generated while measuring an image contrast value of a position which is not a real focusing position being obtained, the image-formation means, the image sensor, and the like are displaced largely in the direction along the optical axis, and the image contrast value at the position may become extremely large as compared with those at other positions. In this case, the position may be erroneously confirmed as a focusing position and a correct focusing position cannot be detected. Accordingly, in the third aspect of the present invention, the image contrast values are smoothed so as to prevent occurrence of an extremely large image contrast value.

As described above, according to the image reading apparatus of the third aspect, the same effects as those of the first and second aspects can be obtained, and the plurality of focusing positions are obtained based on the smoothed value of respective image contrast values at the plurality of positions in the plurality of regions. Accordingly, mistaken detection of the focusing position, caused by vibration of the apparatus, or the like, can be prevented, and as a result, a suitable focusing position can be set.

An image reading apparatus according to a forth aspect of the present invention is characterized in that, in the image reading apparatus of the first or second aspect, the smoothed value is a moving average value of the respective image contrast values.

In a fourth aspect of the present invention, as the smoothed value in the image reading apparatus of the third aspect, the moving average value of the image contrast values can be used.

On the other hand, as in the aforementioned third and fourth aspects of the present invention, even when the focusing position is obtained based on the smoothed value of the image contrast values, an accurate focusing position is not necessarily obtained.

When the position having the maximum evaluation value (for example, the maximum image contrast value) in a region to be subjected to focusing control (that is, a search area) to the direction along an optical axis of the image-formation means is set as a focusing position, for example, when as shown in FIG. 27A, the maximum evaluation value is located at an end portion of the search area, there is a high possibility that an actual maximum value (corresponding to the focusing position) may be located outside the search area (in FIG. 27A, a right-handed side, separated from the search area, on the paper thereof).

Further, there are many cases in which the actual evaluation value greatly varies due to various noises in addition to vibration of the apparatus. In this case, as shown in FIG.

27B, when a difference between the maximum and minimum values of the evaluation value is small, the position of the maximum value is not necessarily the focusing position.

FIGS. 28A to 28F show measurement results of evaluation values (image contrast values) in various images when the original to be read is a negative film in 135 magazines. FIGS. 29A to 29H show measurement results of evaluation values (image contrast values) in various images when the original to be read is a reversal film in 135 magazines. FIGS. 28A and 28B show measurement results of a black image and results of smoothing thereof, FIGS. 28C and 28D show measurement results of a common image and results of smoothing thereof, and FIGS. 28E and 28F show measurement results of an unprocessed but processed negative image and results of smoothing thereof. Further, FIGS. 29A and 29B show measurement results of a black image and results of smoothing thereof, FIGS. 29C and 29D shows measurement results of an image of night sky and results of smoothing thereof, FIGS. 29E and 29F show measurement results of a common image and results of smoothing thereof, and FIGS. 29G and 29H show measurement results of a transparent image and results of smoothing thereof. In the graphs shown in FIGS. 28A to 28F and 29A to 29H, the vertical axis of each graph indicates an image contrast value and the horizontal axis indicates a position in the direction along an optical axis of the image-formation means. Further, "front side", "center", and "back side" shown in these drawings indicate different positions of the image sensor with respect to the direction in which pixels are arranged.

As shown in FIGS. 28A, 28C, 28E and FIGS. 29A, 29C, 29E, 29G, the image contrast value prior to smoothing varies greatly and a plurality of image contrast values are located in the vicinity of the maximum value. Accordingly, there is a high possibility that false focusing be made which results from that the position of the maximum value is merely considered as the focusing position.

On the other hand, it can be considered from the results obtained by smoothing respective measurement results that each maximum value is clarified in, for example, FIGS. 28D and 28F, or FIGS. 29D and 29F and a precise focusing position can thereby be obtained. However, for example, in the positions indicated by "front side" and "back side" in FIG. 29H, the difference between the maximum and minimum values of the image contrast value is small, and in this distribution of the image contrast value, it is considerably difficult to obtain a precise focusing position.

In view of the aforementioned, an image reading apparatus according to a fifth aspect of the present invention is characterized in that, in the image reading apparatus according to any one of the first to fourth aspects of the present invention, in performing focusing control for the plurality of regions of the image, when a predetermined condition corresponding that focusing is made is not satisfied, said control means changes a condition related to the focusing control and performs again the focusing control.

According to the fifth aspect of the present invention, in a case in which focusing control for the plurality of regions of the image is, when the predetermined condition corresponding that focusing can be considered to have been made is not satisfied, a condition related to focusing control is altered and focusing control is performed again by the control means in the image reading apparatus according to any one of the first to fourth aspects.

The above-described predetermined condition corresponding that focusing can be considered to have been made includes, for example, in performing focusing control based on image contrast values at a plurality of locations, a case in which the ratio of the maximum value to the minimum value of the image contrast values at the plurality of locations is a predetermined value (for example, 1.5) or more, a case in which the maximum value of the image contrast values at the plurality of locations is not located at any ends of the plurality of locations, and the like. Further, the above-described condition related to the focusing control includes a position on the original to be read, which is to be subjected to focusing control, a search area in which search for a focusing position is made, a reading position in the image sensor, and the like.

The image reading apparatus according to the fifth aspect can achieve the same effects as those of the first to fourth aspects of the present invention, and further, in performing focusing control for the plurality of regions of the image, when the predetermined condition corresponding that focusing can be considered to have been made is not satisfied, the condition related to focusing control is altered and focusing control is performed again. Accordingly, a more accurate focusing position can be detected, and as a result, a more desirable focused state can be set.

Further, an image reading apparatus according to a sixth aspect of the present invention is characterized in that, in the image reading apparatus according to any one of the first to fifth aspects, prior to the focusing control for the plurality of regions of the image, said control means adjusts an output level of said image sensor.

In the image reading apparatus according to the sixth aspect of the present invention, prior to focusing control for the plurality of regions of the image, the output level of the image sensor is adjusted by the control means in the image reading apparatus according to any one of the first to fifth aspects of the present invention.

Namely, for example, when focusing control is performed based on image contrast values at a plurality of locations, there exist problems that if the output level of the image sensor is extremely high, a false peak (which is not a real peak of the image contrast value, but is apparently regarded as a peak) occurs, and if the output level of the image sensor is extremely low, a desired image contrast value cannot be obtained. The sixth aspect of the present invention is provided in view of the aforementioned problems.

Meanwhile, adjustment of the output level of the image sensor can be made by adjustment of an amount of light irradiated from a light source or the like, adjustment of charge accumulation time of CCD (when a CCD sensor is used as the image sensor), and the like.

As described above, the image reading apparatus according to the sixth aspect of the present invention can achieve the same effects as those of the first to fifth aspects of the present invention, and further, prior to the focusing control for the plurality of regions of the image, adjustment of the output level of the image sensor is made. Accordingly, it is possible to avoid a problem that a false peak occurs or a desired image contrast value cannot be obtained.

A focusing control method according to a seventh aspect of the present invention is constructed in such a manner that focusing control which allows a position where an image is formed by image-formation means, the image-formation means causing one of light transmitted through an original to be read or light reflected by the original to be read so as to form the image, and a position of an image sensor, the image sensor reading an image recorded on the original to be read and outputting read image as image data, to coincide with each other is performed for a plurality of regions of the image recorded on the original to be read, by moving at least one of at least a portion of the image-formation means, the image sensor, and the original to be read in a direction along an optical axis of said image-formation means to obtain a plurality of focusing positions, wherein based on the plurality of focusing positions obtained by the focusing control, a final focusing position is obtained; and at least one of at least the portion of the image-formation means, the image sensor, and the original to be read is controlled so as to be moved to a position based on the final focusing position.

In the focusing control method according to the seventh aspect of the present invention, the final focusing position is obtained based on the plurality of focusing positions for the plurality of regions of the image recorded on the original to be read, and at least one of a portion of the image-formation means, the image sensor, and the original to be read is located at a position based on the final focusing position. Accordingly, in the same way as in the first aspect of the present invention, a desirable focused state can be set for each of the images in the above-described plurality of regions, and even when warping is caused in the original to be read, by providing the above-described plurality of regions along the main scan direction of the original to be read, a focused state which is effective for warping caused in the main scan direction of the original to be read can be set and by providing the above-described plurality of regions along the sub scan direction of the original to be read, a focused state which is effective for warping caused in the sub scan direction of the original to be read can be set. Further, image reading can be effected only based on the determined final focusing position. As a result, as compared with a case in which focusing control is performed each time the original to be read is moved in the sub-scan direction, image reading can be effected in a considerably short time.

A focusing control method according to an eighth aspect of the present invention is characterized in that, in the focusing control method according to the seventh aspect, in order that a region of a main subject recorded on the image be included in a range of a depth of field of the image-formation means when at least one of the at least the portion of the image-formation means, the image sensor, and the original to be read is controlled so as to be moved to the position based on the final focusing position, the final focusing position is obtained based on the plurality of focusing positions and the depth of field.

The focusing control method according to the eighth aspect of the present invention can achieve the same effects as those of the seventh aspect of the present invention, and further, in order that the region of the main subject recorded on the image is included in a depth of field of the image-formation means, the final focusing position is obtained based on the plurality of focusing positions and the depth of field. Accordingly, in the same way as in the second aspect of the present invention, a focused state suitable for an image corresponding to the region of the main subject can be set.

Further, a focusing control method according to a ninth aspect of the present invention is characterized in that, in the focusing control method according to any one of seventh or eighth aspect, wherein the plurality of focusing positions are obtained based on a smoothed value of image contrast values at a plurality of positions in the plurality of regions.

The focusing control method according to the ninth aspect of the present invention can achieve the same effects as those of the seventh and eighth aspects of the present invention, and a plurality of focusing positions are obtained based on a smoothed value of the image contrast values at the plurality of locations in each of the plurality of regions. Accordingly, in the same way as in the third aspect of the present invention, false detection of the focusing position, which is caused by vibration of the apparatus, or the like, can be prevented. As a result, a desirable focusing position can be set.

In a focusing control method according to a tenth aspect of the present invention, the smoothed value is a moving average value of the image contrast values.

Further, a focusing control method according to an eleventh aspect of the present invention is characterized in that, in any one of the seventh to tenth aspects of the present invention, in performing focusing control for the plurality of regions of the image, when a predetermined condition corresponding that focusing is made is not satisfied, a condition related to focusing control is altered and focusing control is performed again.

The focusing control method according to the eleventh aspect of the present invention can achieve the same effects as those of the seventh to tenth aspects of the present invention, and in performing focusing control for the plurality of regions of the image, when the predetermined condition that focusing can be considered to have been made is not satisfied, the condition related to the focusing control is altered and focusing control is performed again. Accordingly, in the same way as in the fifth aspect of the present invention, a more precise focusing position can be detected, and as a result, a more desirable focused state can be set.

A focusing control method according to a twelfth aspect of the present invention is characterized in that, in the focusing control method according to any one of the seventh to eleventh aspects, prior to the focusing control for the plurality of regions of the image, an output level of said image sensor is adjusted.

The focusing control method according to the twelfth aspect of the present invention can achieve the same effects as those of the seventh to eleventh aspects of the present invention, and prior to focusing control for the plurality of regions of the image, the output level of the image sensor is adjusted. Accordingly, in the same way as in the sixth aspect of the present invention, it is possible to settle a problem that a false peak occurs or a desired image contrast value cannot be obtained.

BRIEF DESCRIPTION OF THE DRAWINGS

FIG. 2 is a sectional front view of an optical system of the image reading apparatus according to the embodiments of the present invention.

FIG. 5 is a diagram which schematically shows only a principal portion of the optical system of the image reading apparatus according to the embodiments of the present invention.

FIG. 8 is a perspective view which schematically shows the structure of a standard chart jig and the state of the same being mounted on the line CCD scanner.

FIG. 11 is a flow chart of image reading processing executed by the microprocessor of the line CCD scanner in a first embodiment of the present invention.

FIG. 12 is a flow chart of image test processing executed in the middle of execution of the image reading processing shown in FIG. 11 and FIG. 22.

FIG. 13 is a flow chart of automatic focusing processing executed in the middle of execution of the image reading processing shown in FIG. 11.

FIG. 15 is a schematic side view which shows a positional relationship between a virtual focusing position and a focusing position, which are obtained during the automatic focusing processing, and a main subject region.

FIG. 16 is a graph which shows a value of temperature correction pulse with respect to a temperature difference in a lens unit according to the embodiment.

FIG. 17 is a diagram which schematically shows the state in which the mounting stand moves from a start time of automatic focusing to a stop position.

FIGS. 27A and 27B are diagrams for illustrating problems of conventional arts: FIG. 27A is a graph which shows a state in which a maximum point of an evaluation value is located outside a range of a search area; and FIG. 27B is a graph which shows a state in which a difference between a maximum value and a minimum value of the evaluation value is small.

DESCRIPTION OF THE PREFERRED EMBODIMENTS

An embodiment of the present invention will be hereinafter described in detail with reference to the attached drawings.

First Embodiment

Figure 1:
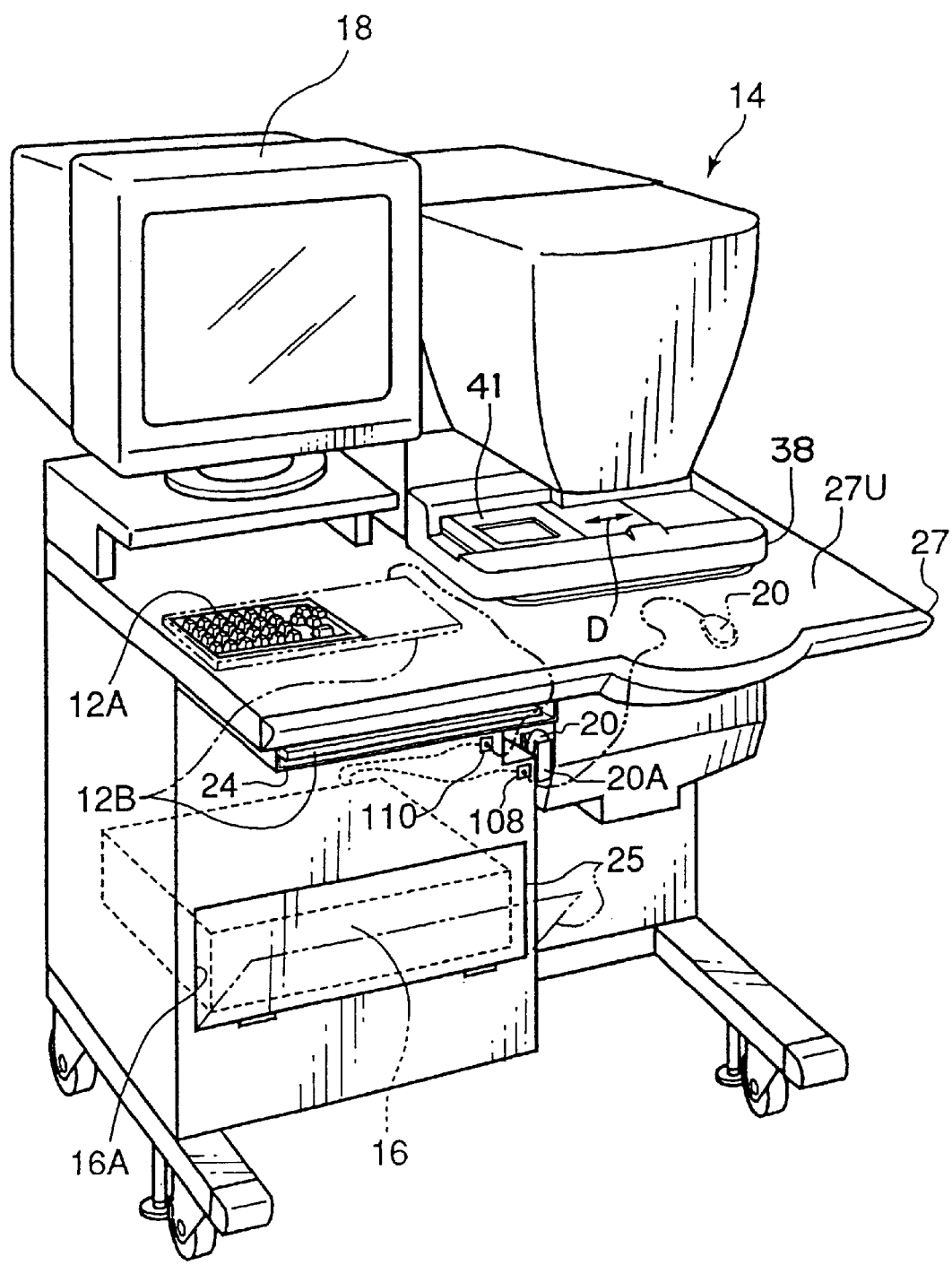
FIG. 1 is an outside view of an image reading apparatus according to embodiments of the present invention.

As shown in FIG. 1, an image reading apparatus according to the embodiment of the present invention includes a line CCD scanner 14. The line CCD scanner 14 is placed on an operation table 27 having an image processing section 16, a mouse 20, two types of keyboards 12A and 12B, and a display 18 provided thereon.

One of the keyboards, the keyboard 12A, is embedded in an operation surface 27U of the operation table 27. Another keyboard 12B is accommodated in a drawer 24 of the operation table 27 when not in use. When using the keyboard 12B, it is taken out of the drawer 24 and placed over the keyboard 12A. At this time, a cord of the keyboard 12B is joined to a jack 110 connected to the image processing section 16.

A cord of the mouse 20 is joined to the image processing section 16 via a through hole 108 formed in the operation table 27. The mouse 20 is accommodated in a mouse holder 20A when not in use. When using the mouse 20, it is taken out of the mouse holder 20A and placed on the operation surface 27U.

The image processing section 16 is accommodated in an accommodating portion 16A provided in the operation table 27 and is closed by a door 25. The image processing section 16 can be taken out by opening the door 25.

The line CCD scanner 14 is used to read film images recorded on a photographic film such as a negative film or a reversal film (positive film). Examples of the photographic film on which film images to be read are recorded include a photographic film in 135 magazines, a photographic film in 110 magazines, a photographic film with a transparent magnetic layer formed thereon (i.e., a photographic film in 240 magazines: a so-called APS film), and photographic films in 120 magazines and 220 magazines (Brownie size). The line CCD scanner 14 reads the above-described film images to be read by a line CCD and outputs image data.

The image processing section 16 inputs image data outputted from the line CCD scanner 14 and effects image processing including various corrections and the like for the inputted image data, and further, outputs, image data for recording to a laser printer section (not shown).

Figure 3:
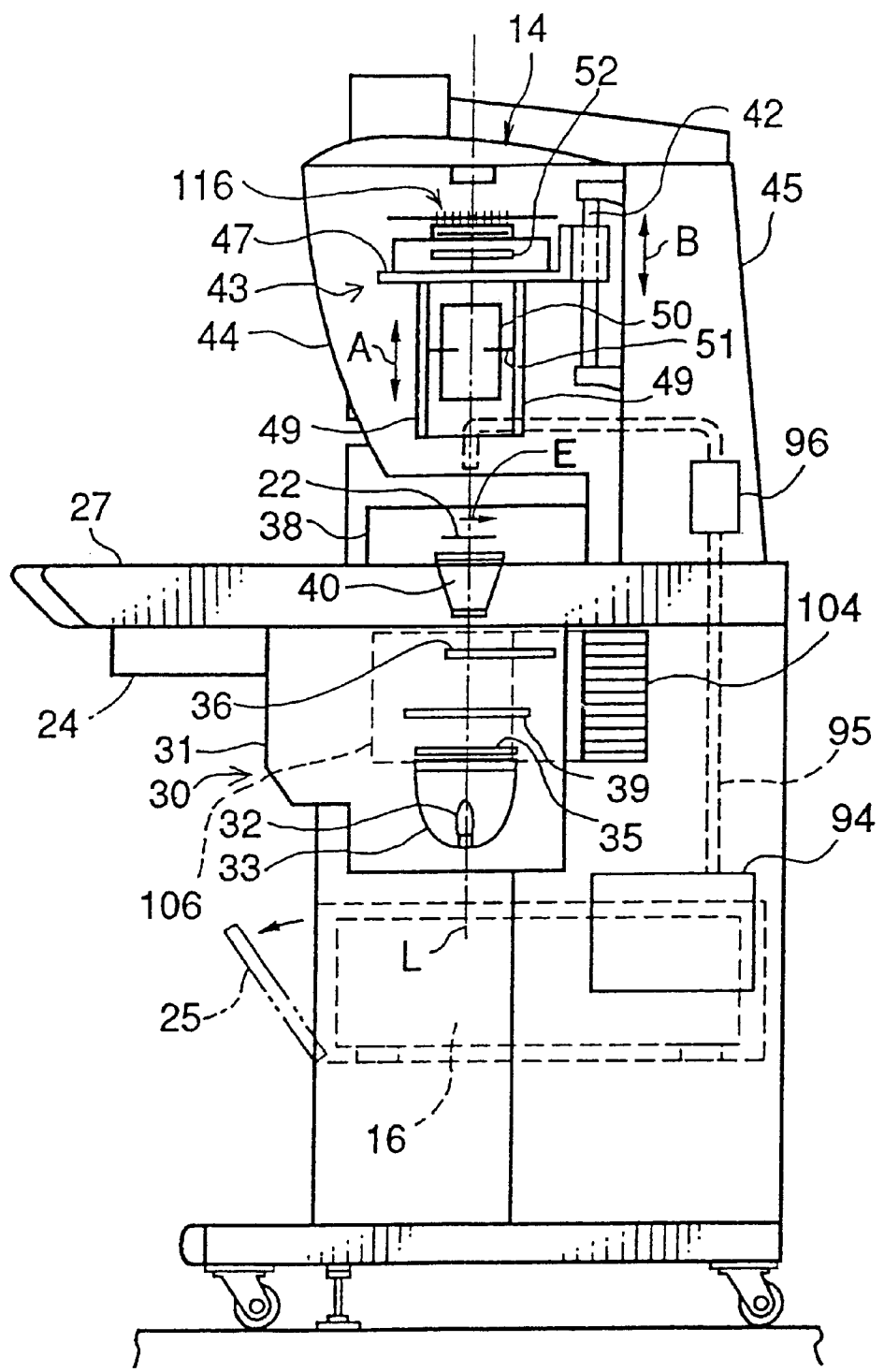
FIG. 3 is a sectional side view of the optical system of the image reading apparatus according to the embodiments of the present invention.

As shown in FIGS. 2 and 3, an optical system of the line CCD scanner 14 includes a light source portion 30, a diffusion box 40, a film carrier 38, and a reading portion 43. The light source portion 30 is disposed below the operation table 27 and the diffusion box 40 is supported by the operation table 27. The film carrier 38 is set on the operation table 27 and the reading portion 43 is disposed at the side of the operation table 27 opposite to the side at which the light source portion 30 is disposed.

The light source portion 30 is accommodated in a casing 31 made of metal. A lamp 32 comprised of a halogen lamp or a metal halide lamp is disposed within the casing 31. The lamp 32 is held by an X-Y stage (not shown) which is movable in two directions, that is, a direction in which the photographic film 22 is conveyed (the direction indicated by arrow D in FIG. 2) and a direction perpendicular to the conveying direction (the direction indicated by arrow E in FIG. 3), and fine adjustment of the position of the lamp 32 is made possible by moving the position of the X-Y stage.

A reflector 33 is provided at a periphery of the lamp 32, and a part of light emitted from the lamp 32 is reflected by the reflector 33 and is reflected off in a fixed direction. A plurality of fans 34 are provided at sides of the reflector 33. The fans 34 are operated when the lamp 32 is lit so as to prevent an interior of the casing 31 from being overheated.

A UV/IR cutting filter 35, a diaphragm 39, and a turret 36 (also seen in FIG. 4B) are arranged in that order at a light emission side of the reflector 33. The UV/IR cutting filter 35 prevents chemical changes caused in the photographic film 22 by cutting light having wavelengths in ultraviolet and infrared regions along an optical axis L of the light emitted from the reflector 33 and further prevents increases in temperature so as to improve reading accuracy. The diaphragm 39 is provided to adjust respective amounts of light from the lamp 32 and light reflected by the reflector 33. The turret 36 includes a negative-film balance filter 36N and a positive-film balance filter 36P, which are embedded in the turret 36 so as to allow proper setting of color components of light which reaches the photographic film 22 and the reading portion 43 in accordance with the kind of photographic film (a negative film or a positive film).

Figure 4A:
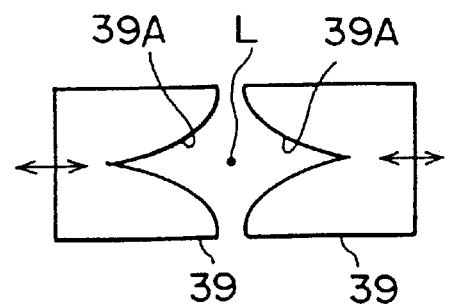
FIGS. 4A, 4B, 4C, and 4D are plan views showing each example of a diaphragm (4A), a turret (4B), a lens diaphragm (4C), and a CCD shutter (4D).

The diaphragm 39 is comprised of a pair of plate materials which are disposed with the optical axis L interposed therebetween. The pair of plate materials are allowed to move in a sliding manner so as to move toward and apart from each other. As shown in FIG. 4A, the pair of plate materials of the diaphragm 39 each include a notch 39A formed at one end thereof in a direction in which the diaphragm 39 slides so that a cross-sectional area of each plate material along a direction perpendicular to the direction of sliding changes continuously from the one end toward the other end of the plate material. The diaphragm 39 is disposed so that the sides of the plate materials with the notches 39A being formed thereon face each other.

In the above-described structure, any one of the filters (36N and 36P) corresponding to the kind of photographic film is located on the optical axis L so that light of desired color components is obtained, and light passing through the diaphragm 39 is adjusted to a desired amount of light by the position of the diaphragm 39.

The diffusion box 40 is formed in such a manner that, toward a top portion thereof (that is, in a direction nearing the photographic film 22), a dimension of the diffusion box 40 along a direction in which the photographic film 22 is conveyed by the film carrier 38 decreases (see FIG. 2) and a dimension of the diffusion box 40 along a direction perpendicular to the direction in which the photographic film 22 is conveyed increases (see FIG. 3). A light diffusion plate (not shown) is mounted at each of a light incident side and a light exit side of the diffusion box 40.

Light made incident on the diffusion box 40 is directed to the film carrier 38 and is made into slit light whose longitudinal direction coincides with a transverse direction of the photographic film 22. Further, the incident light is made into diffused light by a light diffusion plate and is further emitted. Due to the light emitted from the diffusion box 40 being made into diffused light as described above, unevenness in the amount of light illuminated onto the photographic film 22 (whose position is indicated by the broken line in FIG. 2) is decreased and a uniform amount of slit light is illuminated onto a film image. Even if the film image has a defect, the defect is difficult to notice.

The film carrier 38 and the diffusion box 40 are provided for every type of the photographic film 22 and are selected in accordance with the type of the photographic film 22.

An elongated opening (not shown) whose longitudinal dimension is larger than the transverse dimension of the photographic film 22 is formed along the transverse direction of the photographic film 22 at each of positions intersecting the optical axis L on upper and lower surfaces of the film carrier 38. Slit light from the diffusion box 40 is irradiated on the photographic film 22 located on the optical axis L through the opening provided on the lower surface of the film carrier 38, and the light transmitted through the photographic film 22 reaches the reading portion 43 through the opening provided on the upper surface of the film carrier 38.

The film carrier 38 shown in FIGS. 1 to 3 is used to convey a so-called slide, in which one sheet of photographic film 22 is held on a frame (that is, a film mount), to a reading position. The automatic focusing control when the film carrier 38 is used is performed using, as a subject, a film image recorded on the photographic film 22.

As shown in FIG. 1, the film carrier 38 includes a holding member 41 provided in a movable manner in the directions indicated by double-headed arrow D in FIG. 1. Prior to the reading of the photographic film 22, when the holding member 41 holds, at the position shown in FIG. 1, a film mount (slide) on which the photographic film 22 to be read is held, and reads a film image recorded on the photographic film 22, the holding member 41 is moved in the direction indicated by arrow D in FIG. 1, thereby causing the photographic film 22 to pass through a predetermined reading position. The above-described holding member is provided for each type (size) of the photographic film to be read.

In the image reading apparatus according to the present embodiment, in addition to the film carrier 38 for a slide, film carriers used for elongated photographic films in 120 magazines and 220 magazines are also prepared. In the film carrier used for an elongated photographic film, a predetermined image (hereinafter referred to as a chart) is provided in the vicinity of a conveying path of the photographic film and at a position where an image can be read by a line CCD 116, which will be described later, and automatic focusing control using this film carrier is performed with the chart being employed as a subject.

The diffusion box 40 is supported in such a manner that the upper surface thereof comes close to the above-described reading position. For this reason, a notch portion is formed on the lower surface of the film carrier 38 so as to prevent the film carrier 38 and the diffusion box 40 from interfering with each other when the film carrier 38 is mounted.

In the image reading apparatus according to the present embodiment, during reading of a film image, preliminary reading (hereinafter referred to as pre-scan) in which a film image is read at a relatively high speed and with a low precision using a film carrier, and based on image data obtained by the pre-scan, a reading condition at main reading (hereinafter referred to as fine scan) in which a film image is read at a relatively low speed and with a high precision, and processing conditions of various image processing for image data obtained by fine scan are determined. The fine scan is effected under the determined reading condition and image data obtained by the fine scan is subjected to image processing based on the determined processing conditions.

Accordingly, the film carrier is structured in such a manner as to be able to convey the photographic film (that is, slide) at different speeds corresponding to the density of a film image to be subsequently subjected to fine scan, and the like, during pre-scan or fine scan.

The reading portion 43 is disposed in a state of being accommodated within the casing 44. A mounting stand 47 with a line CCD 116 being provided on the upper surface thereof is disposed within the casing 44 and lens barrels 49 extend downward from the mounting stand 47. A lens unit 50 is supported by the lens barrels 49 in such a manner as to move slidably in directions indicated by double-headed arrow A in which it moves toward and apart from the operation table 27, so as to alter the magnification, for example, reduction or enlargement. A supporting frame 45 is provided upright on the operation table 27. The mounting stand 47 is supported by a guide rail 42 mounted on the supporting frame 45 in such a manner as to be slidable in directions indicated by double-headed arrow B in which it moves toward and apart from the operation table 27, so as to maintain a conjugate length during alteration of the magnification, or during automatic focusing.

The lens unit 50 is comprised of a plurality of lenses and a lens diaphragm 51 is provided among the plurality of lenses. As shown in FIG. 4C, the lens diaphragm 51 includes a plurality of diaphragm plates 51A which are each formed to have a substantially C-shaped configuration. These diaphragm plates 51A are arranged around the optical axis L at regular intervals. One end of each diaphragm plate 51A is supported by a pin and the diaphragm plates SA are each allowed to rotate on the pin. The plurality of diaphragm plates 51A are joined together by a link (not shown), and when driving force of a lens diaphragm driving motor (described later) is transmitted to the lens diaphragm 51, these diaphragm plates 51A rotate together in the same direction. Due to the rotation of the diaphragm plates 51A, an area of the region with the optical axis L located as the center, which region is not cut off from light by the diaphragm plates 51A (that is, a substantially star-shaped portion shown in FIG. 4C) changes, and an amount of light passing through the lens diaphragm 51 thereby changes.

In the line CCD 116, three sensing portions each including a large number of photoelectric transfer elements such as CCD cells and photodiodes, which are arranged in a row along the transverse direction of the photographic film 22, and further including an electronic shutter mechanism are provided in parallel at intervals to form three lines and color separation filters of R, G, and B are respectively mounted at light incident sides of the three sensing portions (a so-called three-line primary color CCD). A large number of transmitting portions are respectively provided in the vicinities of the sensing portions so as to each correspond to the sensing portion. Electric charge accumulated in each of CCD cells in each sensing portion is transmitted sequentially via the transmitting portion corresponding to the sensing portion.

A CCD shutter 52 is provided at the side of the line CCD 16 where light is made incident. As shown in FIG. 4D, an ND filter 52ND is fitted in the CCD shutter 52. The CCD shutter 52 rotates in a direction indicated by arrow u so as to be changed to any one of the following states: a completely closed state which causes shading of light made incident on the line CCD 116 for dark correction or for protecting color separation filters provided in the line CCD 116 (a portion 52B, which does not have an ND filter 52ND embedded therein, is located at a position 52c including the optical axis L); a full open state which allows light to be made incident on the line CCD 116 for normal reading or light correction (the position shown in FIG. 4D); and a reduced light state in which light made incident on the line CCD 16 is reduced by the ND filter 52ND for linearity correction (that is, a state in which the ND filter 52ND is located at the position 52C).

As shown in FIG. 3, the operation table 27 is provided with a compressor 94 which generates cooling air for cooling the photographic film 22. The cooling air generated by the compressor 94 is fed by a guide pipe 95 and supplied to a reading portion (not shown) of the film carrier 38. As a result, a region of the photographic film 22 located at the reading portion can be cooled. The guide pipe 95 passes through a flow sensor 96 for detecting the quantity of cooling air flowing.

Figure 6:
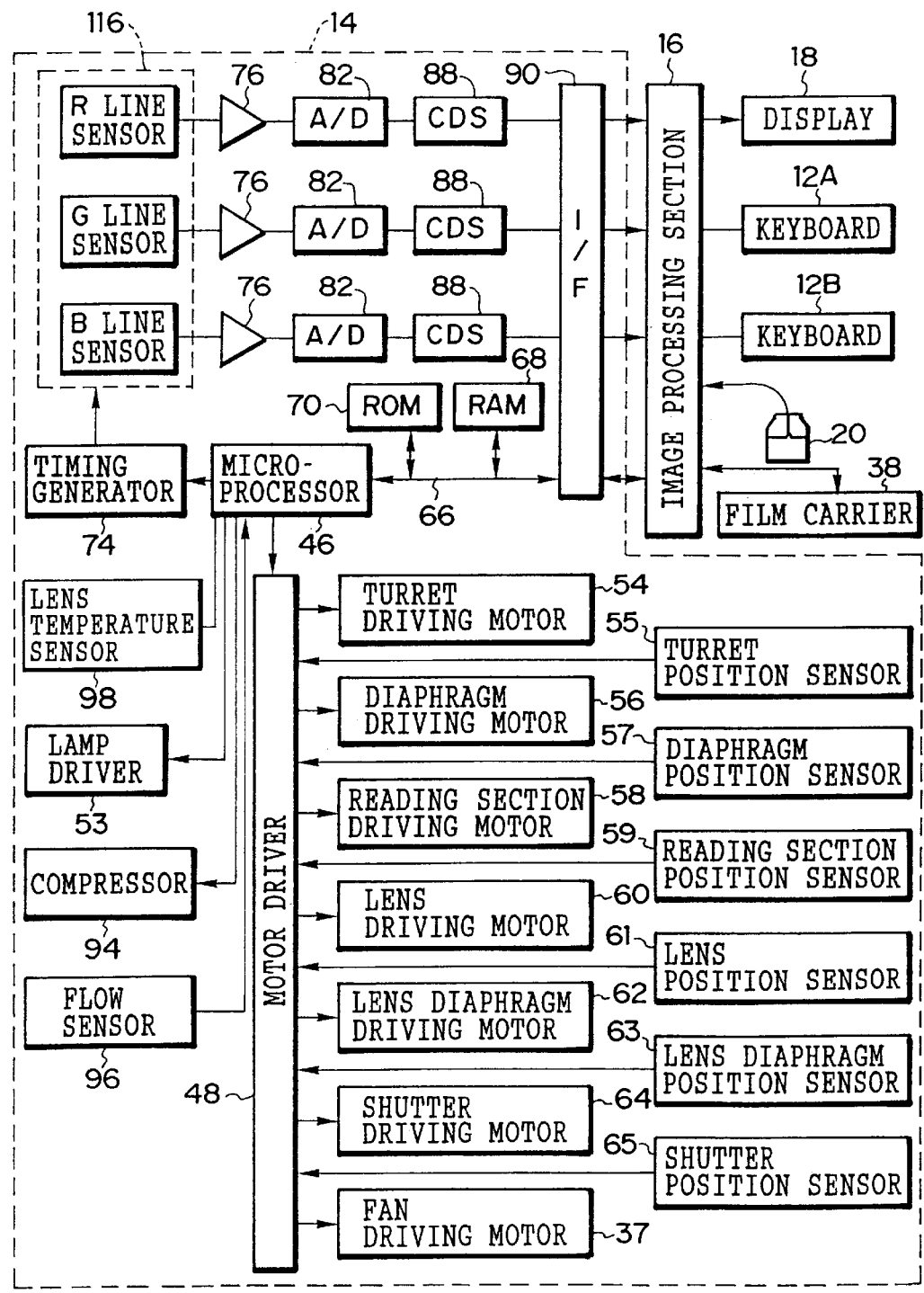
FIG. 6 is a block diagram which schematically shows the structure of an electric system including a line CCD scanner and an image processing section of the image reading apparatus according to the embodiments of the present invention.

Next, with reference to a principal portion of an optical system of the line CCD scanner 14 shown in FIG. 5, a schematic structure of an electric system of the line CCD scanner 14 and of the image processing section 16 will be described while referring to FIG. 6.

The line CCD scanner 14 includes a microprocessor 46 which controls the entire line CCD scanner 14. Connected via a bus 66 to the microprocessor 46 are a RAM 68 (for example, a SRAM) and a ROM 70 (for example, a ROM which allows rewriting of contents stored therein). A lens temperature sensor 98, a lamp driver 53, the compressor 94, the flow sensor 96, and a motor driver 48 are also connected to the microprocessor 46.

The lens temperature sensor 98 is provided to constantly detect the temperature of an interior of the lens unit 50 and the microprocessor 46 can recognize the temperature of the interior of the lens unit 50. Further, the lamp driver 53 turns on and off the lamp 32 in accordance with an instruction from the microprocessor 46. During reading of film images on the photographic film 22, the microprocessor 46 operates the compressor 94 so as to allow supply of cooling air for the photographic film 22. The quantity of cooling air flowing is detected by the flow sensor 96, and based on the detected result, the microprocessor 46 detects malfunction.

Figure 4B:
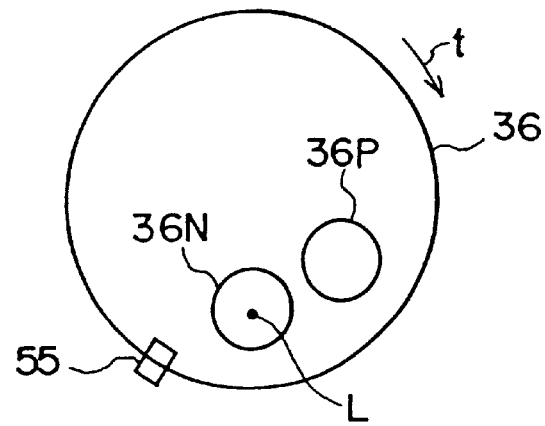
Figure 4C:
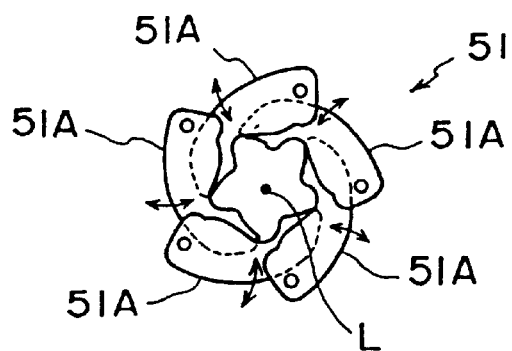
Figure 4D:
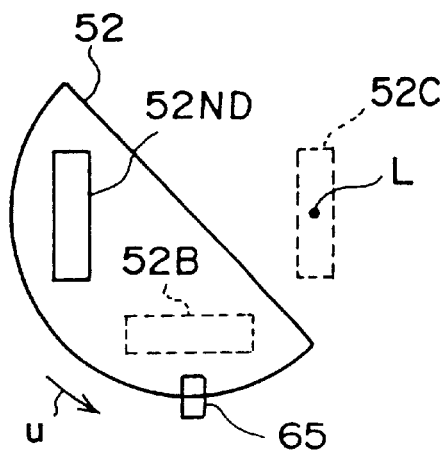

Connected to the motor driver 48 are a turret driving motor 54 and a turret position sensor 55 (also shown in FIG. 4B). The turret driving motor 54 drives to rotate the turret 36 in the direction indicated by arrow t in FIG. 4B so that any one of the negative-film balance filter 36N and the positive-film balance filter 36P is located on the optical axis L, and the turret position sensor 55 detects a reference position (an unillustrated notch) of the turret 36.

Also connected to the motor driver 48 are a diaphragm driving motor 56 for moving the diaphragm 39 in a sliding manner, a diaphragm position sensor 57 for detecting the position of the diaphragm 39, a reading portion driving motor 58 for moving the mounting stand 47 (that is, the line CCD 116 and the lens unit 50) along the guide rail 42 in a sliding manner, a reading portion position sensor 59 for detecting the position of the mounting stand 47, a lens driving motor 60 for moving the lens unit 50 along the lens barrels 49 in a sliding manner, a lens position sensor 61 for detecting the position of the lens unit 50, a lens diaphragm driving motor 62 for rotating the diaphragm plates 51A of the lens diaphragm 51, a lens diaphragm position sensor 63 for detecting the position of the lens diaphragm 51 (that is, the positions of the diaphragm plates 51A), a shutter driving motor 64 for changing the state of the CCD shutter 52 to any one of the completely closed state, the full open state, and the reduced light state, a shutter position sensor 65 for detecting the position of the shutter, and a fan driving motor 37 for driving the fan 34.

During pre-scan and fine scan by the line CCD 116, the microprocessor 46 drives to rotate the turret 36 by the turret driving motor 54 based on respective positions of the turret 36 and the diaphragm 39, which are detected by the turret position sensor 55 and the diaphragm position sensor 57, and further, moves slidingly the diaphragm 39 by the diaphragm driving motor 56 so as to allow adjustment of light irradiated on the film image.

Further, the microprocessor 46 determines a zoom magnification in accordance with the size of a film image or a determination as to whether trimming is carried out, and moves slidingly the mounting stand 47 by the reading portion driving motor 58 based on the position of the mounting stand 47 detected by the reading portion position sensor 59, so that the film image is read by the line CCD 116 at the determined zoom magnification. The microprocessor 46 further moves slidingly the lens unit 50 by the lens driving motor 60 based on the position of the lens unit 50 detected by the lens position sensor 61.

When automatic focusing control is performed in which a light receiving surface of the line CCD 116 is made to coincide with an image-formation position of a film image by the lens unit 50, the microprocessor 46 slides to move only the mounting stand 47 by the reading portion driving motor 58.

Namely, an image forming relation in the line CCD scanner 14 of the present embodiment is determined by relative positions, in the direction of the optical axis L, of the line CCD 116, the lens unit 50, and the photographic film 22 located on the optical axis L. In the present embodiment, as described above, when the zoom magnification is set, the mounting stand 47 is moved in a sliding manner by the reading portion driving motor 58 and the lens unit 50 is also moved in a sliding manner by the lens driving motor 60. In order to the maintain the above-described image forming relation in a state in which the zoom magnification is set as aforementioned, automatic focusing control is performed by varying the distance between the lens unit 50 and the photographic film 22 with the distance between the line CCD 116 and the lens unit 50 being set fixedly.

By performing the automatic focusing control as described above, variation in zoom magnification for each film image when a plurality of film images recorded on the photographic film 22 are continuously read can be suppressed.

In the present embodiment, this automatic focusing control is performed by the Through The Lens (TTL) mode so that the contrast of an image read by the line CCD 116 becomes maximum. Further, in the present embodiment, the automatic focusing control is preceded by focus calibration processing, which will be described later.

A timing generator 74 is connected to the line CCD 116. The timing generator 74 generates various timing signals (clock signals) for operating the line CCD 116, an analog-digital (A/D) converters 82 (described later), and the like.

Output ends of signals from the line CCD 116 are connected via amplifiers 76 to the A/D converters 82, respectively, and the signals outputted from the line CCD 116 are each amplified by the amplifier 76 and is converted to digital data in the A/D converter 82.

An output end of each A/D converter 82 is connected to the image processing section 16 sequentially via a correlation double sampling circuit (CDS) 88 and an interface (I/F) circuit 90. In each CDS 88, feed-through data which represents the level of a feed-through signal and pixel data which represents the level of a pixel signal are each sampled, and the feed-through data is subtracted from the pixel data for each pixel. Then, the CDS 88 sequentially outputs, as scan image data, calculated results (that is, pixel data which exactly corresponds to respective amounts of charge accumulated in the CCD cells) to the image processing section 16 via the I/F circuit 90.

Photometric signals of R, G, and B are outputted from the line CCD 116 in parallel, and therefore, three signal processing systems each including the amplifier 76, the A/D converter 82, and the CDS 88 are provided. The image data of R, G, and B are inputted as scan image data in parallel from the I/F circuit 90 to the image processing section 16.

Also connected to the image processing section 16 are the display 18, the keyboards 12A and 12B, the mouse 20, and the film carrier 38.

In the image processing section 16, dark correction and light correction are performed for the image data of R, G, and B outputted from the line CCD scanner 14 in parallel.

The dark correction is performed to cancel a dark current which flows through the line CCD 116 in a state in which light is not made incident on a light-incident side of the line CCD 116, and allows correction of image data by storing, for each of the cells, data outputted from the line CCD scanner 14 (that is, data which represents a dark output level of each of the cells of the sensing portions of the line CCD 116) in a state in which the light-incidnet side of the line CCD 116 is cut off from light by the CCD shutter 52 and further by subtracting dark output levels of the cell corresponding to the respective pixels from image data outputted from the line CCD scanner 14 after reading the photographic film 22 by the line CCD 116.

The light correction is performed to correct variation in the photoelectric transfer characteristics of the line CCD 116 from cell to cell. In a state in which an adjusting film image in which the density of an entire image plane is fixed is set in the line CCD scanner 14, a gain (light correction data) is determined for each cell based on image data of the adjusting film image outputted from the line CCD scanner 14 after reading the adjusting film image by the line CCD 116 (irregularities in density of respective pixels represented by the image data is caused by the variation in the photoelectric transfer characteristics from cell to cell). Then, image data of a film image to be read, which is outputted from the line CCD scanner 14, is corrected for each of the pixels in accordance with a gain determined for each of the cells.

In the image processing section 16, various image processing is performed which includes gradation conversion, color conversion, hyper-tone processing for compressing the gradation of an ultra-low frequency brightness component of an image, and hyper-sharpness processing for highlighting sharpness while controlling graininess.

The photographic film 22 and the lamp 32 correspond to an original to be read and a light source of the present invention, respectively. The microprocessor 46 and the lens unit 50 correspond to control means and image-formation means of the present invention, respectively. Further, the reading portion driving motor 58 and the lens driving motor 60 correspond to moving means of the present invention, and the line CCD 116 corresponds to an image sensor of the present invention.

Next, as operation of the present embodiment, focus calibration processing executed by the microprocessor 46 of the line CCD scanner 14 will be described with reference to a flow chart shown in FIG. 7. Meanwhile, the focus calibration processing is executed at the time of shipping image reading apparatuses from a factory, and as occasion demands, it is executed again during maintenance of the image reading apparatus.

First, in step 200, it is determined whether a standard chart jig 132 has been mounted at a position where the film carrier 38 is mounted in the line CCD scanner 14. As shown in FIG. 8, the standard chart jig 132 can be mounted, substantially in the same way as a state in which the film carrier 38 is mounted, with rails 136 being guided by guide rails 138 of a carrier stand 137 (not shown in FIGS. 2 and 3) which is provided in the line CCD scanner 14 for being used for mounting the film carrier 38. A glass plate 134 with a standard chart 135 provided at the center thereof is applied onto an upper surface of an opening portion 133 formed substantially at the center of the standard chart jig 132, and in a state in which the standard chart jig 132 is mounted on the carrier stand 137, the optical axis L and the center of the standard chart 135 are provided to coincide with each other.

When the standard chart jig 132 is mounted at the position where the film carrier 38 is mounted in the line CCD scanner 14, the decision of step 200 is affirmative, and the process proceeds to step 202, in which the value of magnification W is set at 0.6 as an initialization. In step 204, a temperature of an interior of the lens unit 50 (hereinafter referred to as a reference temperature) is detected by the lens temperature sensor 98 and is stored in a predetermined region of RAM 68. Subsequently, in step 206, focusing position search processing is executed. Next, with reference to FIG. 9, the focusing position search processing will be described.

In step 250, the mounting stand 47 and the lens unit 50 are moved in a sliding manner by the reading portion driving motor 58 and the lens driving motor 60 so that a magnification in the lens unit 50 becomes the magnification W.

In the subsequent step 252, the mounting stand 47 is moved in a sliding manner by the reading portion driving motor 58 to a search start position in a search area for a focusing position of the standard chart 135 provided in the standard chart jig 132 which is mounted in the line CCD scanner 14. The search area for a focusing position of the standard chart 135 is obtained in advance by an experiment or the like for each of different magnifications and is stored in the ROM 70. The microprocessor 46 reads out a search area corresponding to a present magnification (=0.6 power) form the ROM 70, and moves slidingly the mounting stand 47 to the search start position so that the shortest focal length is obtained in the search area. In this case, a search end position is that having the longest focal distance in the search area.

In the subsequent step 254, a search operation is started by starting sliding movement of the mounting stand 47 by the reading portion driving motor 58 at a predetermined speed toward a search end position. In step 256, the process is placed in a waiting state until a predetermined time elapses. The predetermined time is a time which a period of sliding movement of the mounting stand 47 at the predetermined speed from the search start position to the search end position is divided by a predetermined number (in the present embodiment, six sections).

When the predetermined time has elapsed, the decision of step 256 is affirmative, and the process proceeds to step 258, in which an image contrast value of the standard chart 135 read by the line CCD 116 at this point in time is calculated and is stored in a predetermined region of the RAM 68. The image contrast value in the present embodiment is an integrated value of Modulation Transfer Function (MTF) of a predetermined spatial frequency in a read image.

In step 260, it is determined whether the mounting stand 47 has reached the search end position based on positional information of the mounting stand 47 by the reading portion position sensor 59. When it has not reached the search end position, the process returns to step 256, and the operation of step 256 to step 260 is repeatedly executed until it has reached the search end position. By executing the operation repeatedly, image contrast values at a plurality of positions (in the present embodiment, six positions) in the above-described search area are calculated and are stored in the RAM 68.

When the mounting stand 47 has reached the search end position, the decision of step 260 is affirmative, and the process proceeds to step 262, in which the search operation ends by stopping the sliding movement of the mounting stand 47. In the subsequent step 264, among the six positions in the search area, in which image contrast values are stored in the RAM 68 by the operation of the above-described steps 256 to 260, a position having the maximum image contrast value is determined as a focusing position and is stored in a predetermined region of the RAM 68, and thereafter, this focusing position search processing ends.

Figure 10:
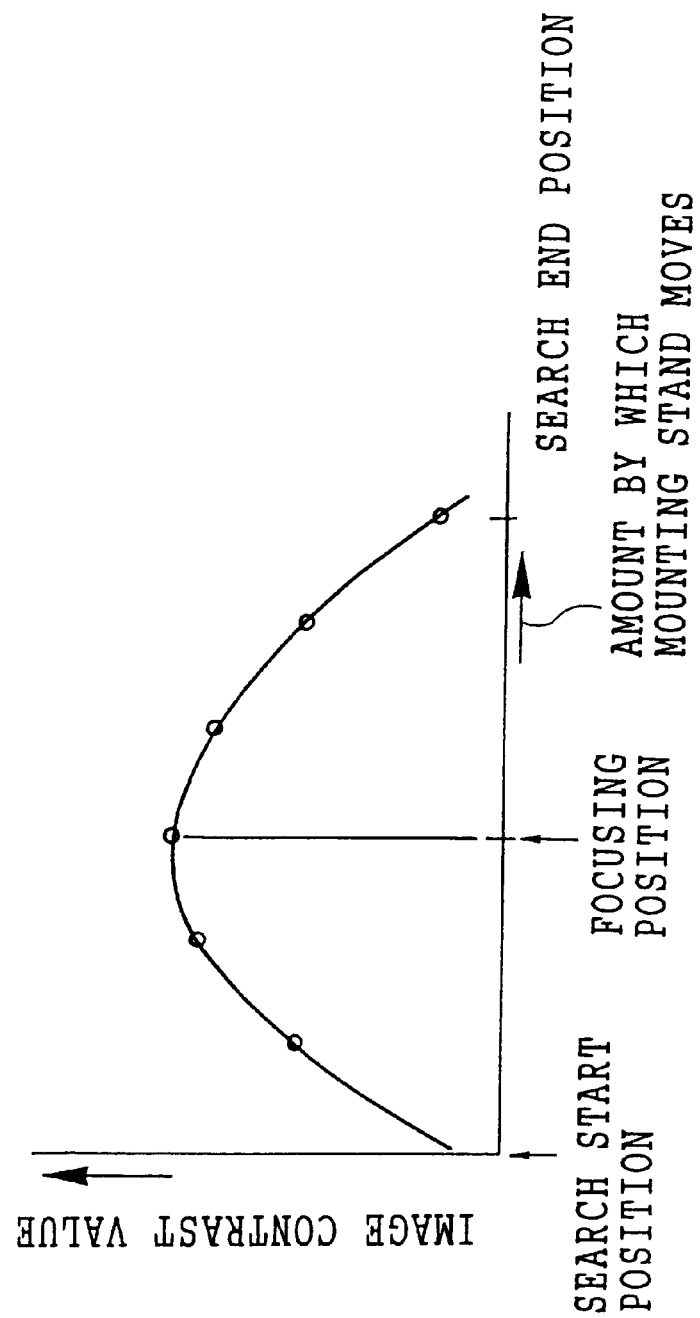
FIG. 10 is a graph which shows variation of an image contrast value caused by movement of a mounting stand, and a focusing position.

Namely, repetition of steps 256 to 260 makes it possible to obtain the image contrast values at six positions between the search start position and the search end position as shown in FIG. 10, and therefore, the position having the maximum image contrast value among these positions is determined as a focusing position. Meanwhile, when the reading portion driving motor 58 is a pulse motor, the focusing position can be represented by a driving pulse number (hereinafter referred to as focusing pulse number) of the reading portion driving motor 58 for movement of the mounting stand 47 from a mechanical original point (hereinafter referred to as an original point, H.P.). The following description will be given for a case in which various (different) positions of the mounting stand 47, such as focusing positions, are each represented by a driving pulse number.

Figure 7:
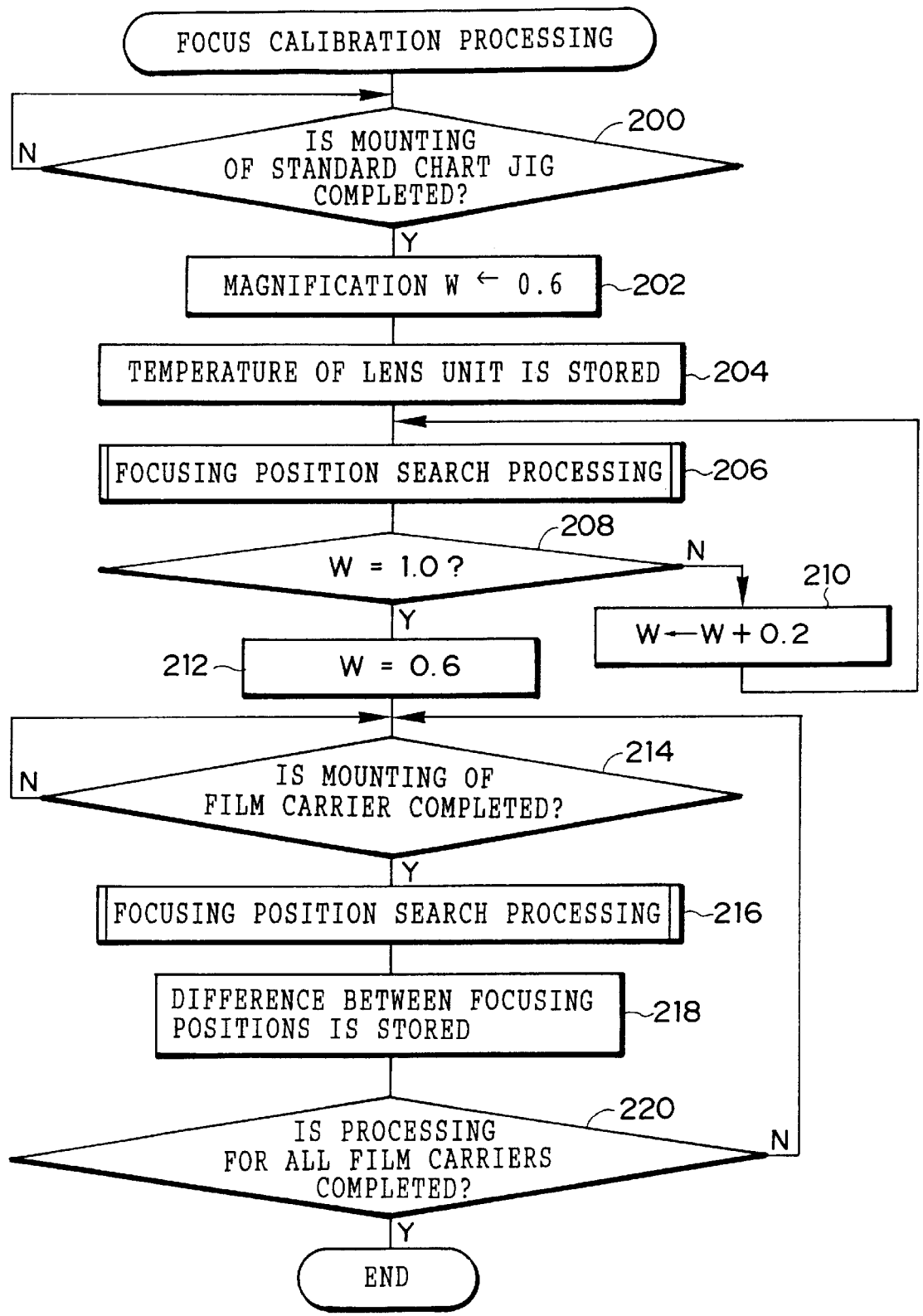
FIG. 7 is a flow chart of focus calibration processing executed by a microprocessor of the line CCD scanner in the embodiments of the present invention.

When the focusing position search processing ends, the process proceeds to step 208 shown in FIG. 7, in which it is determined whether the value of magnification W is 1.0. When it is not 1.0, the process proceeds to step 210, in which the magnification W is increased by 0.2. Thereafter, the process returns to the above-described step 206 and the focusing position search processing is executed again. When the value of magnification W is 1.0, the process proceeds to step 212. Accordingly, by effecting the operation of steps 206 to 210, the respective focusing positions at three types of magnification of 0.6, 0.8, and 1.0 are stored in the predetermined region of the RAM 68.

In step 212, the value of magnification W is set to be 0.6. In the subsequent step 214, it is determined whether one of a plurality of film carriers provided in advance as a film carrier which is usable in the line CCD scanner 14 has been mounted in the line CCD scanner 14. In this case, the above-described standard chart jig 132 is removed from the line CCD scanner 14.

Figure 9:
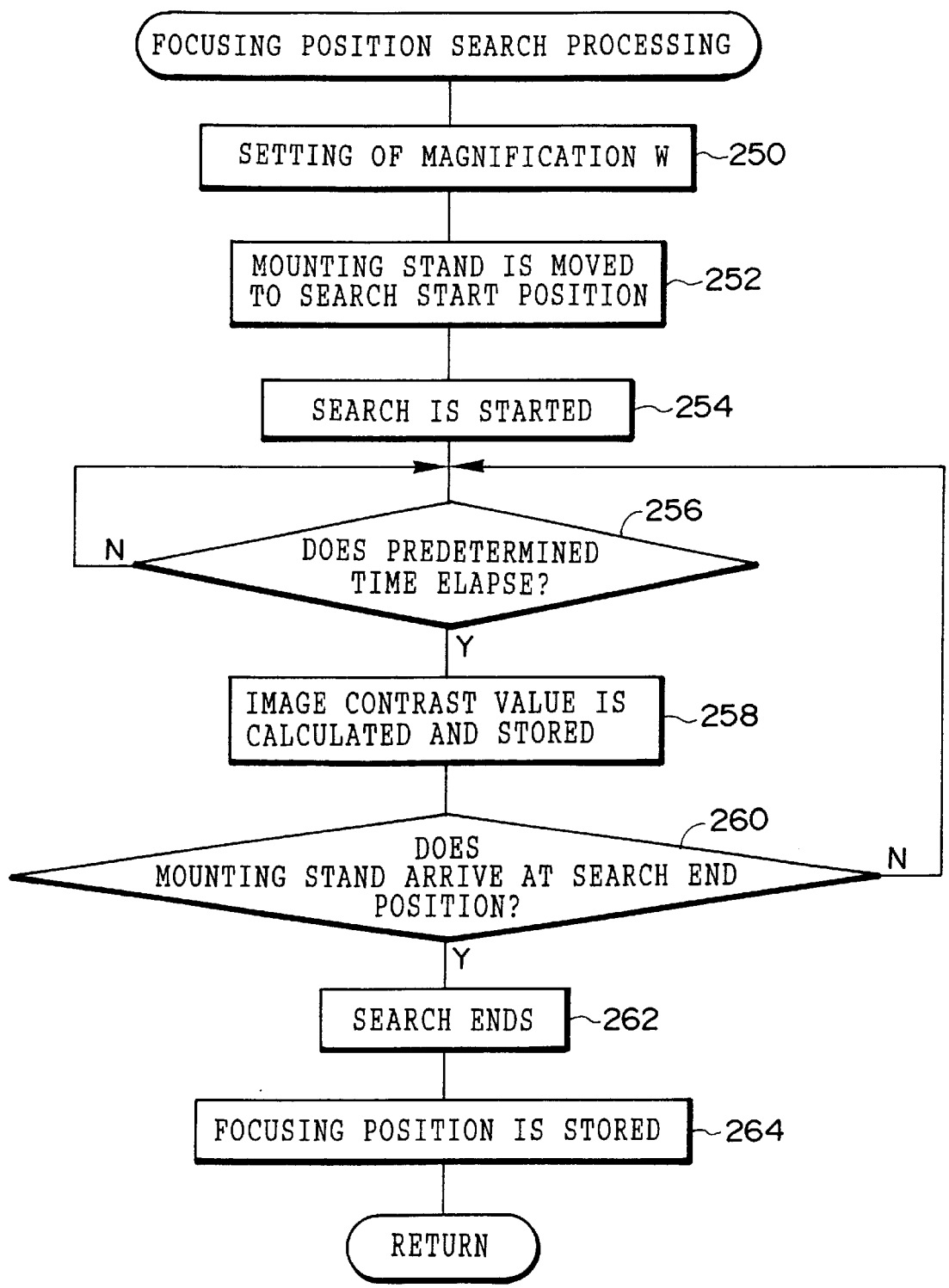
FIG. 9 is a flow chart of focusing-position search processing executed in the middle of the focus calibration processing shown in FIG. 7.

When any one film carrier is mounted in the CCD scanner 14, the decision of step 214 is affirmative, and the process proceeds to step 216, in which the focusing position search processing shown in FIG. 9 is executed. In the focusing position search processing, the focusing position when the magnification W is set to be 0.6 is stored in RAM 68 in accordance with the above-described operation. At this time, when the film carrier mounted in the line CCD scanner 14 is a film carrier used for a photographic film in 135 magazines or in 240 magazines, namely, a film carrier for an elongated photographic film, a focusing position in which a chart provided in the film carrier is set as a subject is stored in the RAM 68.

On the other hand, when the film carrier mounted in the line CCD scanner 14 is that used for a slide, the thickness of a mount varies depending on the kind of mount, and therefore, the position of the photographic film in the direction of the optical axis with respect to a holding member provided for each type (size) of the photographic film and used to hold the mount in the film carrier changes. Further, it is difficult to identify the kind of a mount to be used, and therefore, in the focus calibration processing, a typical mount is used and a focusing position at a predetermined position (for example, a center position) of the photographic film is stored in the RAM 68 for each kind of holding member.

In the subsequent step 218, a difference between the focusing position to the standard chart 135 when the magnification W stored in the RAM 68 in the above-described step 206 is 0.6, and the focusing position stored in the RAM 68 in the above-described step 216 (in the present embodiment, subtraction of the focusing position of the standard chart 135 obtained in step 206 when the optical magnification W is 0.6 from the focusing position obtained in step 216), is obtained and stored in the predetermined region of the RAM 68. Accordingly, in this step 218, when the magnification W is 0.6, a difference between the position of a chart of the film carrier mounted in the line CCD scanner 14 (or the position of a film image on a slide) and the position of the standard chart 135 is stored.

In the subsequent step 220, it is determined whether the operation of steps 214 to 218 has been completed for each of all film carriers prepared in advance. When it has not been completed, the process returns to step 214 and the operation of steps 214 to 218 is performed for each of all of unprocessed film carriers. Thereafter, the focus calibration processing ends.

When the above-described focus calibration processing ends, an operator stores, in the ROM 70, the respective focusing positions of the standard chart 135 at different magnifications and the above described differences in the focusing position for various film carriers when the magnification is 0.6, which are stored in the RAM 68, in a tabular format, and further stores, in the ROM 70, the reference temperature stored in the RAM 68 in the above-described step 204.

Table 1 shows examples of the focusing positions of the standard chart 135 at different magnifications and of above described differences in the focusing position for various film carriers when the magnification is 0.6, which are stored by an operator in the ROM 70 in a tabular format. In Table 1, when the film carrier is that used for a slide, the differences in the focusing position when the holding member for each of the photographic films in 135 magazines and in 240 magazines is used are shown. Those thus stored in the ROM 70 in a tabular format will be hereinafter referred to as a focus calibration table.

TABLE 1

| | Magnification [power] | | |
|---|---|---|---|
| | 0.6 | 0.8 | 1.0 |
| Focusing position of Standard chart (focusing pulse number) | 1500 | 2300 | 2500 |
| Difference   For slide | | | |
| 135 | 100 | — | — |
| 240 | 70 | — | — |
| For film in 135 | 50 | — | — |
| For film in 240 | 90 | — | — |

By adding the difference in the focusing position for each film carrier to each of the focusing positions at different magnifications of the standard chart 135 shown in Table 1, a focusing position which becomes a standard of the mounting stand 47 during automatic focusing at each of magnifications (0.6, 0.8, 1.0), which will be hereinafter referred to as a reference focusing position, can be obtained for each film carrier (in the case of a film carrier for a slide, for each kind of holding member).

Concretely, for example, the reference focusing position at the magnification of 1.0 (power) when the holding member for the photographic film in 135 magazines is used at the time of using the film carrier for a slide is 2600 (=2500+100), the reference focusing position at the magnification of 0.6 (power) at the time of using the film carrier for a photographic film in 135 magazines is 1550 (=1500+50), and the reference focusing position at the magnification of 0.8 (power) at the time of using the film carrier for a photographic film in 240 magazines is 2390 (=2300+90).

Next, image reading processing of the photographic film 22 executed by the microprocessor 46 of the line CCD scanner 14 will be described with reference to the flow chart shown in FIG. 11. Meanwhile, in the line CCD scanner 14, as a mode during reading of the photographic film, a "pre-scan mode" and a "fine scan mode" are set in advance, and states of various sections of the line CCD scanner 14 in each of the modes are also set in advance. Further, the present embodiment will be described for a case in which a photographic film to be read is a negative film in 135 magazines held on a film mount. Accordingly, the film carrier used herein is the film carrier 38 for a slide, and prior to execution of the image reading processing, a film mount on which the photographic film 22 to be read is supported is held by the holding member 41 of the film carrier 38, and the holding member 41 is located at the position shown in FIG. 1.

In step 300 shown in FIG. 11, the process proceeds to the "pre-scan mode", in which operations of various sections are controlled in accordance with the states of the various sections, which are set in advance as the "pre-scan mode" so that pre-scan for the photographic film 22 is effected under a predetermined reading condition.

Namely, the lamp 32 is turned on by the lamp driver 53, the diaphragm 39 is moved by the diaphragm driving motor 56 to a position during pre-scan, the turret 36 is rotated by the turret driving motor 54 to a negative-film position (i.e., a position where the negative-film balance filter 36N is positioned on the optical axis L), the mounting stand 47 and the lens unit 50 are moved in a sliding manner by the reading portion driving motor 58 and the lens driving motor 60 respectively so that the magnification in the lens unit 50 becomes 1.0, the lens diaphragm 51 is moved to a full open position by the lens diaphragm driving motor 62, and the CCD shutter 52 is moved by the shutter driving motor 64 to a full open position. Further, with respect to the timing generator 74, an operation time of an electronic shutter of the line CCD 116 (that is, a reading cycle of the line CCD 116 on every line (charge accumulation time)) is set at t, which is a minimum value of the operation time. The speed at which the photographic film 22 is conveyed by the film carrier 38 is set as 5×v, which is a maximum value of the speed (that is, a speed which is five times of a conveying speed of a normal film image at fine scan). Accordingly, pre-scan for the photographic film 22 is carried out at a high speed with a relatively coarse resolution and is completed in a short time.

In the subsequent step 302, pre-scan is started in such a manner that an instruction for conveying the photographic film 22 in a predetermined direction (the direction indicated by arrow D in FIG. 2) is given to the film carrier 38, the photographic film 22 conveyed at the maximum conveying speed (5×v) is read by the line CCD 116 at a shortest reading cycle (t), signals outputted from the line CCD 116 are sequentially subjected to A/D conversion and outputted, as pre-scan data, to the image processing section 16.

In step 304, it is determined whether pre-scan has been performed to the end of the photographic film 22, and the process is placed in a waiting state until the decision of step 404 is affirmative.

During the pre-scan, in the image processing section 16, image data inputted from the line CCD scanner 14 is sequentially stored in a storage portion (not shown), and based on the stored image data, edge positions at both ends of a film image recorded on the photographic film 22 in the direction in which the photographic film 22 is conveyed (that is, ends of the film image at upstream and downstream sides) are each determined.

The determination of the edge positions can be made, as proposed by the present inventors in Japanese Patent Application Laid-Open (JP-A) Nos. 8-304932, 8-304933, 8-304934, and 8-304935, by calculating, based on a density value for each pixel represented by pre-scan data, a density variation value along a direction in which the film is conveyed for each pixel, adding respective density variation values along the conveying direction of the film for the pixels on each line along a direction perpendicular to the conveying direction of the film, and comparing respective added values of every line.

In the image processing section 16, based on the determined edge position, the frame position of a film image is determined so as to correspond to the position of a film mount, and the determined frame position is stored in the storage portion (not shown), and further, based on the frame position, image data in a region with the film image recorded thereon is cut out from the stored image data and is stored in the storage portion (not shown).

When pre-scan has been completed to the trailing end of the photographic film 22 in the conveying direction (when the decision of step 304 is affirmative), in step 306, predetermined image characteristic amounts of a film image are calculated from the pre-scan image data stored in the storage portion (not shown) by the image processing section 16 at pre-scan. The predetermined image characteristic amounts also include a color balance value of the film image (specifically, a ratio of a minimum density value (or a maximum luminance value) for each of component colors of the film image).

In step 306, based on the calculated image characteristic amounts, the kind of the film image (size and density level) and a processing condition of image processing for the fine scan image data are set by calculation.

When a photographic film in 135 magazines is used as the photographic film 22 to be read, the size of a film image (in this case, the frame size of a film image) can be determined based, for example, whether the density or color tint of a predetermined portion, the predetermined portion being provided within an image recording range in a standard-size film image and the predetermined portion being provided outside the image recording range in a panorama-size film image, corresponds to that of an unexposed portion (in a negative film, a white region).

Further, as disclosed in JP-A Nos. 8-304932, 8-304933, 8-304934, and 8-304935, the size (aspect ratio) of a film image may be determined by, based on respective density values of pixels represented by image data at pre-scan, calculating a density variation value along a direction perpendicular to the conveying direction of the film for each pixel, adding respective density variation values, along the direction perpendicular to the conveying direction of the film, of the pixels by lines along the conveying direction of the film, and further, comparing added values by lines, or may be determined based on a ratio of an image, which is a binary image provided by obtaining a threshold value from a density histogram, existing in each region of an image, or further, may be determined based on the dispersion and average value of density variation values in the above-described predetermined portion. Alternatively, the size of a film image may also be determined using a combination of the above-described methods.

The density level of a film image can be determined based on the density classification of low density, normal density, high density, ultra high density, and the like by making a comparison of, for example, average density, maximum density, or minimum density with a predetermined value. Further, as the processing condition for image processing, for example, an enlargement/reduction ratio of an image, a processing condition of image processing for hyper-tone or hyper-sharpness (specifically, compression of gradation to an ultra low frequency brightness component of an image, or a gain (degree of highlighting) for a high frequency component or an intermediate frequency component of an image), and a gradation conversion condition are calculated.

When setting of the size and processing condition of image processing for each of all frame images are completed as described above, in step 308, image test processing is executed. The image test (inspection) processing will be hereinafter described with reference to the flow chart shown in FIG. 12.

First, in step 400, pre-scan image data of a film image and a processing condition of image processing are fetched from the image processing section 16.

In step 402, based on the pre-scan image data of a film image and the processing condition of image processing fetched in step 400, predetermined image processing (enlargement/reduction of an image, gradation conversion, hyper-tone processing, or hyper-sharpness processing) is performed for the pre-scan image data in accordance with the processing condition. The predetermined image processing is equivalent to image processing effected for fine scan image data in the image processing section 16. In pre-scan, a film image is read at a resolution lower than that at fine scan, and data quantity of pre-scan image data is smaller than that of fine scan image data, and therefore, the image processing in step 402 is completed in a comparatively short time.

In the subsequent step 404, the image data having been subjected to the image processing is corrected in accordance with the characteristics of the display 18 so that a state in which the image data is displayed on the display 18 (a visualized state of the image data) becomes the substantially same as a result of printing in a laser printer section (not shown), and the corrected data (simulation image data) is temporarily stored in the RAM 68.

In step 406, based on the above-described simulation image data, a simulation image of a film image is displayed on the display 18. In the subsequent step 408, by displaying a message for requesting an operator to test the simulation image on the display 18, or the like, the operator is requested to test the simulation image.

As a result, the operator visually confirms (checks) the simulation image displayed on the display 18 and makes various determination to effect a test operation for inputting determination results. Namely, it is first determined whether a frame position of the film image determined in the image processing section 16 is proper. When it is determined that the frame position is proper, a determination as to whether the image quality of the simulation image is proper (that is, whether the processing condition calculated in the image processing section 16 is proper) is made. When it is determined that the image quality (that is, processing condition) is not proper, a determination is made as to the manner in which the processing condition should be corrected.

When it is determined that the frame position and image quality of the simulation image are proper, information which indicates "test is OK" is inputted, via the keyboard 12A or the like, as a test result. When it is determined that the frame position of the simulation image is not proper, information which indicates the manner in which the frame position of the simulation image should be corrected is inputted, as the test result, via the keyboard 12A or the like. When it is determined that the image quality of the simulation image is not proper, information which indicates correction of the processing condition for a film image corresponding to the simulation image is inputted, via the keyboard 12A or the like, as the test result.

For example, in a film image obtained by photographing using stroboscopic flash or in a film image with backlit scene, the contrast of the image becomes excessively high, and in a simulation image, in a background with respect to a main subject, the detail is lost. In such cases, the operator inputs, as the information which indicates correction of the processing condition, information which indicates correction of the degree of highlighting for high-luminance data among ultra low frequency brightness component of an image so that the gradation is compressed only in a region corresponding to the background in an image, that is, the degree of compression of the gradation of ultra low frequency brightness components (that is, a high luminance region in an image of ultra-low frequency brightness components extracted from the image) of an image by the hyper-tone processing becomes high.

Further, for example, when sufficient sharpness is not obtained in the simulation image, the operator inputs, as the information which indicates correction of the processing condition, information which indicates correction of the degree of highlighting for high frequency components of the image, or the like so as to allow highlighting of sharpness. Further, for example, in a film image in an underexposed or overexposed state, the density of a simulation image thereof is entirely biased to the level of high density or low density, or the contrast of the simulation image becomes excessively low. In such cases, the operator inputs, as the information which indicates correction of the processing condition, information which indicates correction of a conversion curve of a gradation conversion condition so that total density or contrast becomes appropriate.

In the subsequent step 410, it is determined whether the test result has been inputted via the keyboard 12A or the like from the operator, and the process is placed in a waiting state until the test result is inputted. When the test result has been inputted, the process proceeds to step 412, in which contents of information inputted as the test result is checked. When information which indicates correction of the frame position or of the processing condition is inputted as the test result, the process proceeds to step 414, in which the inputted contents of correction of the frame position or of the processing condition are reflected in the frame position or processing condition obtained in the image processing section 16.

Namely, when the inputted instruction for correction is that which indicates correction of the frame position of a film image, the frame position of the film image has been corrected in accordance with the above-described instruction for correction, and thereafter, in the same way as in the aforementioned step 306, pre-scan image data is cut out again from pre-scan data in accordance with the corrected frame position, a predetermined image characteristic amount is calculated from the cut-out pre-scan image data, and the type of the film image and the processing condition of image processing are reset by calculation. By correcting the frame position as described above, an image portion on the photographic film 22 can reliably be read during fine scan.

Further, when the inputted instruction for correction is that which indicates correction of the processing condition of a film image, only the processing condition of a film image is corrected. For example, if the instruction for correction of the processing condition is that for correction of the degree of highlighting for specified frequency components, among processing conditions of image processing, the degree of highlighting for corresponding frequency components is corrected. Further, if the instruction for correction of the processing condition is that for correction of a conversion curve of a gradation conversion condition, among processing conditions of image processing, a conversion curve represented by the gradation conversion condition is corrected entirely or partially in accordance with the instruction for correction. As a result, a processing condition suitable for the film image can reliably be set.

When the contents of correction for the frame position or the processing condition has been reflected as described above, the process proceeds to step 416, in which pre-scan image data of a film image whose frame position or processing condition has been corrected, and the processing condition are fetched from the image processing section 16. Thereafter, the process returns to step 402.

As a result, steps 402 and 404 are executed again for the film image whose frame position or processing condition has been corrected, and a simulation image of the film image is displayed again on the display 18. Then, by the operator visually confirming (checking) the regenerated simulation image of the film image, it is possible for the operator to easily determine whether contents of an instruction for correction inputted in advance are appropriate.

The operation of steps 402 to 416 is executed repeatedly by an instruction from the operator until the frame position and image quality of the simulation image displayed on the display 18 are each determined as an appropriate one and the information which indicates "test is OK" is inputted as the test result (that is, until the decision of step 412 is negative), and the frame position or processing condition of a film image corresponding to the simulation image is corrected in accordance with an instruction from the operator. Then, the information which indicates "test is OK" is inputted from the operator via the keyboard 12A or the like, and when the decision of step 412 is negative, this image test processing ends.

When the image test processing ends, in step 310 shown in FIG. 11, an instruction for reversing the direction in which the photographic film 22 is conveyed is given to the film carrier 38. At this point in time, the photographic film 22 is moved toward the right of the directions indicated by the double-headed arrow D in FIG. 2 and is positioned at a right hand end of the film carrier 38, and therefore, when the instruction of step 310 is given, the movement of the photographic film 22 toward the left of the directions indicated by the double-headed arrow D in FIG. 2 is started.

In step 312, the process is placed in a waiting state until the center of the photographic film 22 in the conveying direction reaches the reading position, and when the film has reached the reading position, the process proceeds to step 314, in which an instruction for stopping conveying the photographic film 22 is given to the film carrier 38, and therefore, the conveyance of the photographic film 22 is stopped.

In the subsequent step 316, automatic focusing processing (focusing control processing) is executed. The automatic focusing processing will be described with reference to the flow chart shown in FIG. 13 and the schematic diagram shown in FIG. 14. In the automatic focusing processing according to the present embodiment, as shown in FIG. 15, focusing positions are respectively obtained for three regions obtained in advance by an experiment or the like, that is, a region 152A and a region 152C, which are located in vicinities of both end portions, in a main scan direction, of a main subject region 150 on the photographic film 22, and a region 152B including the center of the photographic film 22, and based on the three focusing positions, a focusing position 156 to be set is obtained.

First, in step 450 shown in FIG. 13, a focusing position (=2500) of the standard chart 135 at a magnification (in the present embodiment, 1.0) which is the same as that at fine scan, and a difference (=100) caused in a film carrier for a slide when the holding member 41 for a photographic film in 135 magazines is used are read from a focus calibration table (see Table 1) stored in the ROM 70 based on the focus calibration processing shown in FIG. 7, and these values are added together so that a reference focusing position (also seen in FIG. 14) is obtained, and further, a reference temperature is read out from the ROM 70.

In step 452, the temperature within the lens unit 50 is acquired by the lens temperature sensor 98. In the subsequent step 454, based on a difference between the reference temperature acquired in step 450 and the temperature within the lens unit 50 acquired in step 452, a temperature correcting pulse is acquired. As is well known, a focusing position of a lens varies at a gradient corresponding to the magnification in accordance with the lens temperature, and therefore, it is necessary to correct the reference focusing position in accordance with the difference of temperature. Accordingly, in the present embodiment, for example, as shown in FIG. 16, a temperature correction table in which an amount of movement of the mounting stand 47 in the direction of the optical axis L with respect to the difference of temperature at each of different magnifications of the lens unit 50 is represented by a driving pulse number (hereinafter referred to as a temperature correcting pulse number) of the reading portion driving motor 58 is previously stored in the ROM 70. In step 454, the temperature correcting pulse number with respect to the difference of temperature at each magnification during fine scan is read out from the ROM 70.

When the temperature correcting pulse is acquired, in step 456, by adding the reference focusing position (focusing pulse number) acquired in step 450 and the temperature correcting pulse number acquired in step 454, a predicated focusing position (also seen in FIG. 14) in which variation of a focusing position caused by the difference between the temperatures at this point in time and at focus calibration is corrected is determined.

In the subsequent step 458, with the predicted focusing position thus obtained being set as a reference, a search area of an actual focusing position is set. In the present embodiment, the length in the direction of the optical axis L and a position with respect to the predicted focusing position , of an area in which the focusing position should be searched for, are in advance stored in the ROM 70 for each kind of film carrier and for each of the regions 152A to 152C (also seen in FIG. 15) in which the focusing positions are to be searched for. The stored values are read, and with the predicted focusing position being set as a reference, a search area (also seen in FIG. 14) is set. In the present embodiment, the search area for the region 152A is first set.

When setting of the search area has been completed, in the subsequent step 460, the mounting stand 47 is slidingly moved by the reading portion driving motor 58 to a search start position in the above-described search area. The microprocessor 46 moves the mounting stand 47 in a sliding manner to the search start position so that the shortest focal length is obtained in the range of the above-described search area. In this case, a search end position is a position (also shown in FIG. 14) in which the longest focal length is obtained in the range of the above-described search area.

In step 462, a search operation is effected by starting sliding movement of the mounting stand 47 by the reading portion driving motor 58 to the search end position at a predetermined speed. In the subsequent step 464, the process is placed in a waiting state until a predetermined time elapses. Meanwhile, the predetermined time is a time in which a period of sliding movement of the mounting stand 47 at the predetermined speed from the search start position to the search end position is divided by predetermined number (in the present embodiment, six ).

When the predetermined time has elapsed (when the decision of step 464 is affirmative), the process proceeds to step 466, in which an image contrast value in an image of the region 152A read by the line CCD 116 at this point in time is calculated and is stored in a predetermined region of the RAM 68. Meanwhile, the image contrast value in the present embodiment is a moving average value of an integrated value of MFT of a predetermined spatial frequency region in the read image.

In step 468, based on the positional information of the mounting stand 47 by the reading portion position sensor 59, it is determined whether the mounting stand 47 has reached the search end position. When it has not reached, the process returns to the above-described step 464, and the operation of steps 464 to 468 is executed repeatedly until the mounting stand 47 has reached the search end position. By performing the aforementioned operation repeatedly, the respective image contrast values (moving average values) at a plurality of positions (in the present embodiment, six positions) in the above-described search area of the region 152A are calculated and stored.

When the mounting stand 47 has reached the search end position (when the decision of step 468 is affirmative), the process proceeds to step 470, in which the search operation ends by stopping the movement of the mounting stand 47. In the subsequent step 472, among the six reading positions of the region 152A within the search area, in which the respective image contrast values are stored in the RAM 68 by the above-described operation of steps 464 to 468, a position at which the image contrast value is the greatest is determined as a virtual focusing position 154A in the region 152A.

In the subsequent step 474, it is determined whether the operation of steps 458 to 472 has been completed for each of all the regions in which respective focusing positions should be detected, and when the operation has not been completed for all the regions, the process returns to step 458 and the operation of steps 458 to 472 is effected for each of remaining regions. As a result, virtual focusing positions 154B and 154C are similarly determined for the regions 152B and 152C, respectively. Meanwhile, the virtual focusing positions 154A to 154C correspond to a plurality of focusing positions of the present invention.

When the virtual focusing positions 154A to 154C in the regions 152A to 152C are determined (when the decision of step 474 is affirmative), the process proceeds to step 476, in which based on the virtual focusing positions 154A to 154C, a final focusing position 156 to be set is determined. In this case, the determination of the focusing position 156 can be made, as an example, in the following manner. In the following examples, the virtual focusing positions 154A, 154B, and 154C are indicated by KA, KB, and KC, respectively.

EXAMPLE 1

The focusing position 156 is obtained by the following expression (1):

$$\text{focusing position} = (\max(KA, KB, KC) + \min(KA, KB, KC))/2 \quad (1)$$

wherein, max (KA, KB, KC) indicates a virtual focusing position located at the highest place in the direction of the optical axis, and min (KA, KB, KC) indicates a virtual focusing position located at the lowest place in the direction of the optical axis (the same shall apply hereinafter).

That is, the focusing position 156 obtained by the expression (1) is located at a central position of the virtual focusing position located at the highest place and the virtual focusing position located at the lowest place in the direction of the optical axis.

EXAMPLE 2

The focusing position 156 is obtained by the following expression (2):

$$\text{focusing position} = (KA+KB+KC)/3 \quad (2)$$

Namely, the focusing position 156 obtained by the expression (2) is obtained as an arithmetic mean value of the three virtual focusing positions.

EXAMPLE 3

The focusing position 156 is obtained by the following expression (3):

$$\text{focusing position} = (KA+2KB+KC)/4 \quad (3)$$

Namely, the focusing position 156 obtained by the expression (3) is obtained by an arithmetic mean value of the three virtual focusing positions when a weight (in this case, 2) is added to the virtual focusing position 154B.

EXAMPLE 4

The focusing position 156 is obtained by the following expression (4):

$$\text{focusing position} = (\max(KA, KC) + \min(KA, KC))/2 \quad (4)$$

wherein, max (KA,KC) indicates one of the virtual focusing positions 154A and 154C, which is located at a higher place than the other, and min (KA,KC) indicates one of the virtual focusing positions 154Aa and 154C, which is located at a lower place than the other (the same shall apply hereinafter).

EXAMPLE 5

When a condition represented by the following expression (5) is satisfied, the focusing position 156 is obtained by the expression (1). When the condition is not satisfied, the focusing position 156 is obtained by the following expression (6).

$$\max(KA,KB,KC) - \min(KA,KB,KC) \leq H \quad (5)$$

$$\text{focusing position} = \max(KA,KB,KC) - H/2 \quad (6)$$

wherein, H indicates a depth of field of the lens unit 50.

Namely, when the distance between the virtual focusing position located at the highest place in the direction of the optical axis and the virtual focusing position located at the lowest place in the direction of the optical axis is less than or equal to the depth of field of the lens unit 50, the main subject region 150 (see FIG. 15) is generally included within the depth of field of the lens unit 50 with the focusing position 156 calculated using the expression (1) being set as the center. However, when the distance between the virtual focusing position located at the highest place in the direction of the optical axis and the virtual focusing position located at the lowest place in the direction of the optical axis is greater than the depth of field of the lens unit 50, the main subject region 150 is not included within the depth of field of the lens unit 50 at the focusing position 156 calculated using the expression (1).

Accordingly, in this case, by calculating the focusing position 156 using the expression (6), the main subject region 150 is provided to be, as far as possible, included within the depth of field of the lens unit 50 with the focusing position 156 set as the center.

On the other hand, there are cases in which a region where a virtual focusing position cannot be determined exists due to the following reasons: the density of a film image within a region for determination is too high; and the contrast within the region for determination is too low.

In this case, the focusing position 156 can be determined, for example, in such a way as described below.

EXAMPLE 6

When the virtual focusing position 154B (that is, the virtual focusing position located at the highest place in the direction of the optical axis) cannot be determined, the focusing position 156 is obtained by the following expression (7):

$$\text{focusing position} = \max(KA, KC) \qquad (7)$$

Namely, one of the virtual focusing positions 154A and 15C, which is placed at a higher place than the other, is located between the three virtual focusing positions, and therefore, by setting this higher position as the focusing position 156, the main subject region 150 is provided to be, as far as possible, included within the depth of field of the lens unit 50.

EXAMPLE 7

When the virtual focusing position 154A (that is, a virtual focusing position which is not the virtual focusing position located at the highest place in the direction of the optical axis) cannot be determined, the focusing position 156 is obtained by the following expression (8):

$$\text{focusing position} = (KB + KC)/2 \qquad (8)$$

Meanwhile, when only one virtual focusing position can be determined or when none of virtual focusing positions can be determined, in the present embodiment, with the predicted focusing position (see FIG. 14) obtained based on the focus calibration table being set as the focusing position 156, subsequent fine scan is performed.

When the focusing position 156 is thus determined, the process proceeds to step 478, in which the mounting stand 47 is moved to be located at the focusing position 156 and is further moved in an opposite direction by a predetermined distance to eliminate backlash of a driving system of the mounting stand 47. Thereafter, the automatic focusing operation ends.

FIG. 17 shows the state in which the mounting stand 47 moves in the above-described automatic focusing operation. As illustrated in this figure, the mounting stand 47 moves from an original position (indicated as an automatic focusing start position) to a search start position in the search area by step 460 shown in FIG. 13, and thereafter, the mounting stand 47 further moves to a search end position at a predetermined speed. At this time, the microprocessor 46 calculates and stores an image contrast value (that is, a movement average value) based on image data obtained by the line CCD 116 at each predetermined time. Subsequently, the mounting stand 47 moves to be located at the focusing position 156 determined by step 476, and thereafter, further moves in an opposite direction by a predetermined distance to eliminate backlash of a driving system of the mounting stand 47 and stops at the correct focusing position 156.

Figure 18:
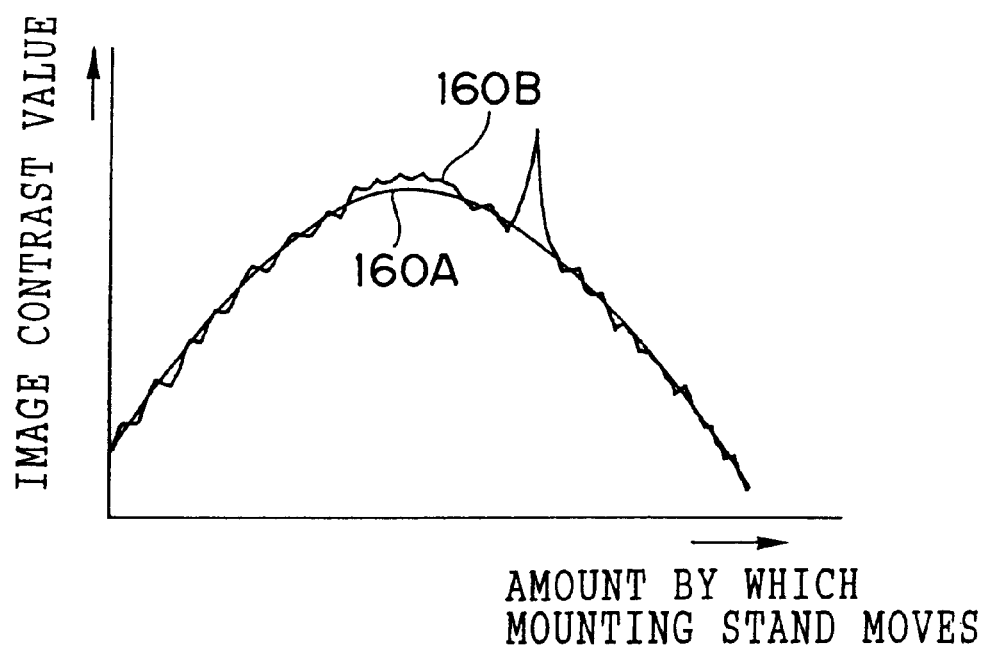
FIG. 18 is a graph which shows the state of an image contrast value when vibration is generated.

On the other hand, as shown in FIG. 18, every image contrast values within the search area, which are obtained in the automatic focusing operation, are usually supposed to be located on a smooth curve 160A. However, when the image reading apparatus vibrates during the automatic focusing processing, every image contrast values are brought into a state of being positioned on a vibrating curve 160B depending on the vibrational state. Accordingly, when a large vibration is generated in a state in which the mounting stand 47 is located at a position different from an actual focusing position, the image contrast value at this position becomes larger than those of other positions and this position is erroneously determined as the focusing position.

For this reason, in the present embodiment, every image contrast values obtained during the automatic focusing processing are smoothed by being set as a moving average value.

Figure 19:
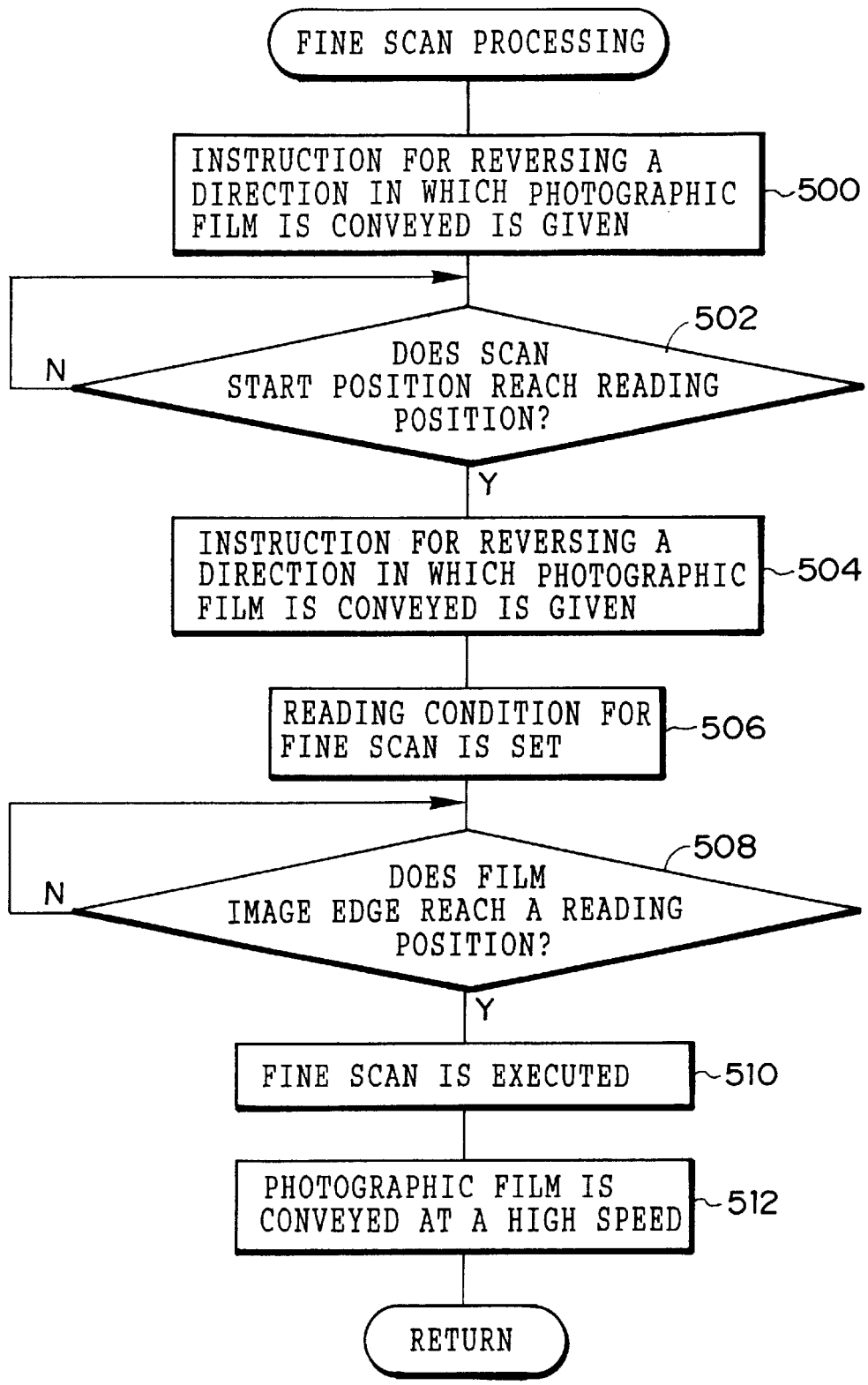
FIG. 19 is a flow chart of fine scan processing executed in the middle of execution of the image reading processing shown in FIG. 11 and FIG. 22.

When the automatic focusing processing ends, in step 318 shown in FIG. 11, fine scan processing is executed. Next, fine scan processing will be described with reference to the flow chart shown in FIG. 19.

First, in step 500, an instruction for reversing the direction in which the photographic film 22 is conveyed is given to the film carrier 38 and the photographic film 22 is thereby moved toward the right in the directions indicated by double-headed arrow D in FIG. 2. Namely, at this point in time, the photographic film 22 is located at a position (that is, a position indicated by the broken line in FIG. 2) where the center of the photographic film 22 in the conveying direction is located at a reading position by the above-described automatic focusing processing, and therefore, in step 500, the movement of the photographic film 22 from this position toward the right in the directions indicated by double-headed arrow D in FIG. 2 is started.

In the subsequent step 502, the process is placed in a waiting state until a scan start position on the photographic film 22 during fine scan reaches the reading position. Namely, in the present embodiment, the speed at which the photographic film 22 is conveyed during fine scan is set in advance, and a distance of the length of the photographic film 22 corresponding to the above-described conveying speed (hereinafter referred to as a run-up distance) is required in order that the photographic film 22 in a stopped state is brought into a state of being conveyed at the conveying speed. For this reason, when conveying of the photographic film 22 is started from the state in which a reading start position of a film image (i.e., an edge of the film image) is located at the reading position, reading of the film image cannot be properly performed. Accordingly, in step 502, with a position returned from the reading start position of the film image by a run-up distance being set as the scan start position, the photographic film 22 is conveyed until the scan start position reaches the reading position.

Meanwhile, the speed at which the photographic film 22 is conveyed during fine scan may be changed in accordance with the density of a film image to be read, and the like.

When the scan start position reaches the reading position, the decision of step 502 is affirmative and the process proceeds to step 504, in which an instruction for reversing the direction in which the photographic film 22 is conveyed is given to the film carrier 38 and the conveying direction of the photographic film 22 is reversed.

In the subsequent step 506, operations of various sections of the line CCD scanner 14 are controlled so that fine scan for a film image is effected under a reading condition suitable for the type of a film image. Namely, setting of a fine scan mode corresponding to the type of a film image subsequently subjected to fine scan is effected.

In step 508, it is determined whether, based on a frame position stored in a storage portion (not shown) of the image processing section 16, an edge of the film image subsequently subjected to fine scan has reached the reading position (that is, a position on the optical axis) of the line CCD 116, and the process is placed in a waiting state until the decision of step 508 is affirmative.

When the decision of step 508 is affirmative, the process proceeds to step 510 in which fine scan is performed in such a manner that a film image having reached the reading position is read by the line CCD 116, signals outputted from the line CCD 116 are sequentially subjected to A/D conversion and are further outputted, as fine scan image data, to the image processing section 16. As a result, fine scan for the film image is performed under an optimal reading condition for each kind of film image.

The fine scan image data outputted from the line CCD scanner 14 to the image processing section 16 is subjected to image processing in the image processing section 16 under a processing condition stored in advance and is further outputted to and printed in a laser printer section (not shown).

When fine scan is completed, the process proceeds to step 512, in which an instruction for conveying the photographic film 22 at a high speed (in the present embodiment, 5 x v) is given to the film carrier 38 so that the photographic film 22 is discharged from the film carrier 38 at the high speed. Thereafter, the fine scan processing ends and the image reading processing shown in FIG. 11 thereby ends.

Figure 20:
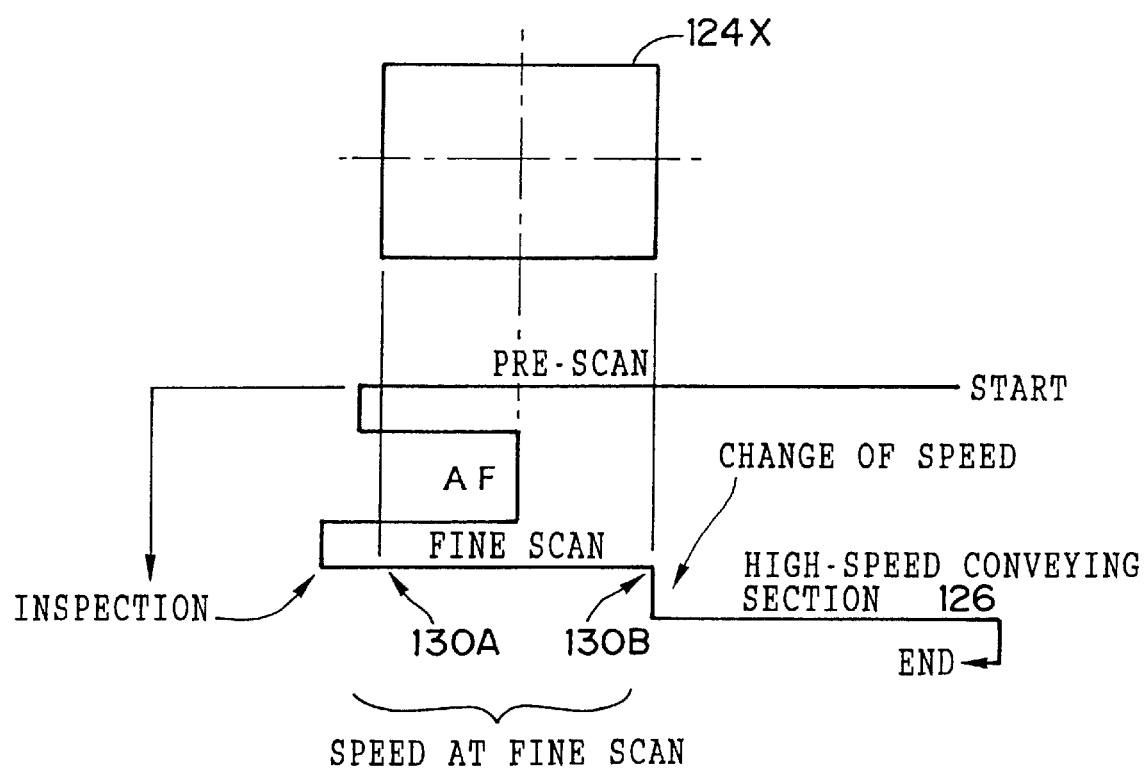
FIG. 20 is a conceptual diagram which shows a positional relation of a line CCD relative to a photographic film at the time of the image reading processing when a film carrier for a slide is used.

FIG. 20 is a conceptual diagram which shows an overall flow of the above-described image reading processing. In FIG. 20, relative movement of the reading position with respect to the photographic film is indicated by an arrow from "start" to "end". Namely, in the image reading processing of the present embodiment, after pre-scan for a film image 124X of a slide, which is conveyed at a predetermined speed at pre-scan (in the present embodiment, 5×v), image test for the film image 124X is conducted, and automatic focusing processing (in FIG. 20, indicated as "AF") is performed in such a manner that the slide is moved so that substantially the center of the film image 124X in the conveying direction coincides with the optical axis L.

Subsequently, the slide is conveyed in the same direction as the conveying direction during pre-scan and is further moved until the scan start position reaches the reading position, and thereafter, the direction in which the slide is conveyed is reversed again and the speed at which the slide is conveyed is changed to a predetermined conveying speed during fine scan. Further, setting of various sections corresponding to the type of the film image 124X, or the like is effected, and thereafter, the reading of the film image 124X is performed in a period of time from a reading start position 130A to a reading end position 130B. Subsequently, the slide is conveyed at a high speed (in the present embodiment, 5×v) in a high-speed conveying section 126 and is discharged from the film carrier 38.

As described above, in the image reading apparatus according to the present embodiment, during the automatic focusing processing, a final focusing position is set based on focusing positions (virtual focusing positions) of three or two regions in the main scan direction of a photographic film to be read. Accordingly, even when the photographic film to be read is curved in the main scan direction, a suitable focusing position can be set easily and in a short time.

In the image reading apparatus according to the present embodiment, an image contrast value obtained during the automatic focusing processing is used as a moving average value, and therefore, mistaken setting of a focusing position caused by vibration or the like can be prevented.

Second Embodiment

In a second embodiment of the present invention, there will be explained a mode for carrying out the invention in a case in which, in performing automatic focusing control in automatic focusing processing, when a predetermined condition that focusing can be considered to have been made is not satisfied, a condition related to focusing control is altered and focusing control is performed again, and prior to the focusing control, an output level of the line CCD 116 is adjusted, that is, mode for carrying out the image reading apparatus according to the fifth aspect of the present invention and the focusing control method according to the eleventh aspect, and the image reading apparatus according to the sixth aspect and the focusing control method according to the twelfth aspect. It should be noted that the image reading apparatus according to the second embodiment has the same structure as that of the image reading apparatus according to the first embodiment and a description thereof will be omitted.

First, a description will be given of processing for adjustment of an output level of the line CCD 116 prior to execution of focusing control (hereinafter referred to as CCD output adjustment processing) with reference to FIG. 21. In the CCD output adjustment processing according to the present embodiment, a target charge accumulation time is obtained for each of regions on the line CCD 116, which regions correspond to the three regions, 152A, 152B, and 152C shown in FIG. 15, and based on respective target charge accumulation time of the regions on the line CCD 116, an overall target charge accumulation time of the line CCD 116, which is to be set, is obtained. Prior to the CCD output adjustment processing, a film mount on which the photographic film 22 to be read is supplied is held by the holding member 41 of the film carrier 38, and the holding member 41 is located at the position shown in FIG. 1. Further, in the present embodiment, the CCD output adjustment processing is performed prior to execution of image reading processing.

Figure 21:
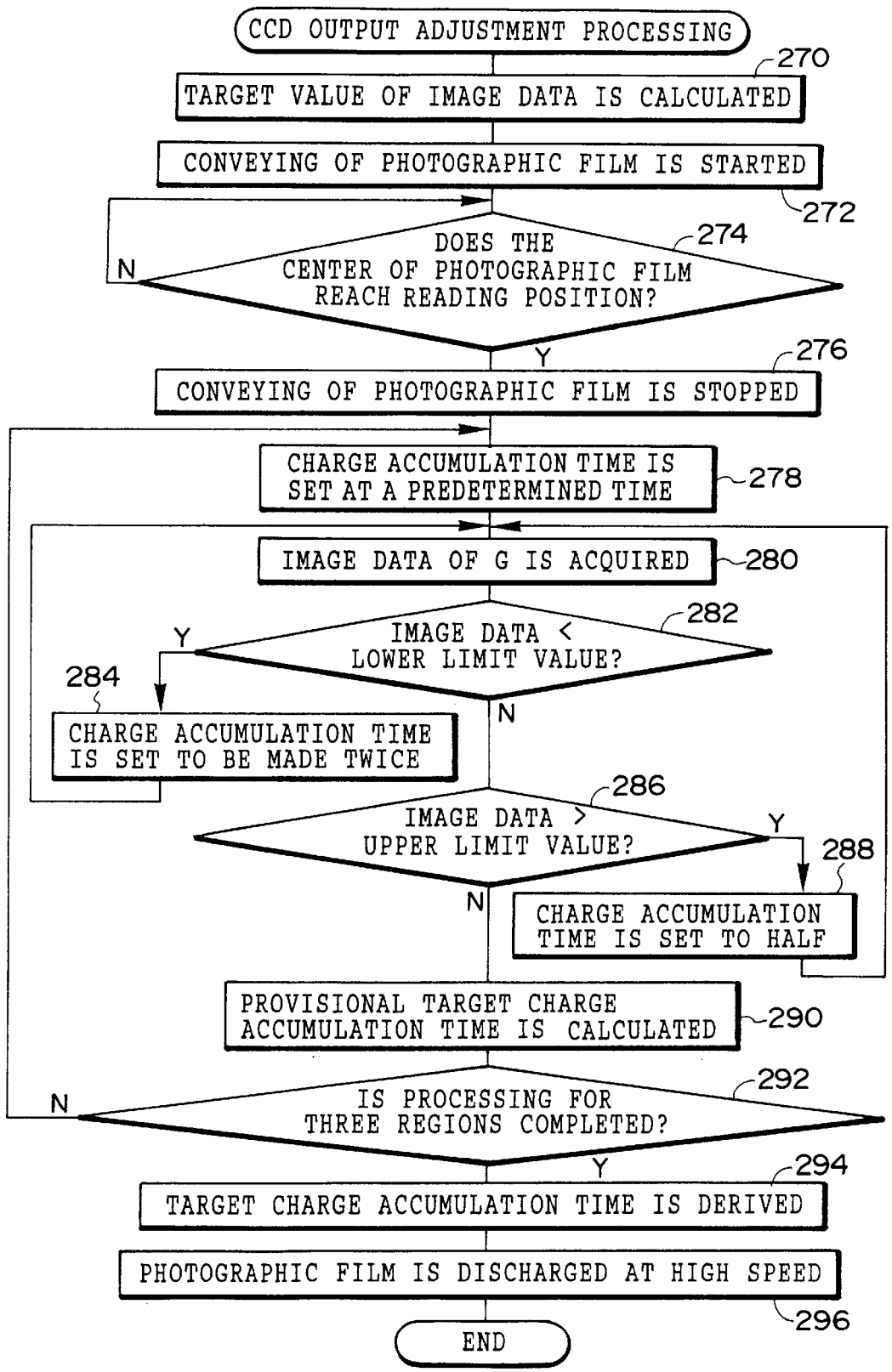
FIG. 21 is a flow chart of CCD output adjustment processing which is executed by a microprocessor of a line CCD scanner in a second embodiment of the present invention.

In step 270 shown in FIG. 21, a target value GM of image data is calculated. The target value GM in the present embodiment is a value of image data corresponding to 30% of a saturation output level of the line CCD 116.

In step 272, by giving an instruction for conveying the photographic film 22 in a predetermined direction (that is, a right-handed direction of double-headed arrow D in FIG. 2) to the film carrier 38, conveying of the photographic film is started. In the subsequent step 274, the process is placed in a waiting state until the center of the photographic film 22 in the direction in which the film is conveyed reaches a reading position. When the center of the photographic film has reached the reading position, the process proceeds to step 276, in which an instruction for stopping conveying the photographic film 22 is given to the film carrier 38 and the conveying of the photographic film 22 is thereby stopped.

In step 278, a charge accumulation time DT of the line CCD 116 is set at a predetermined time (in the present embodiment, the maximum value of the charge accumulation time of the line CCD 116). In the subsequent step 280, in the above-described state, image data of green (G) is acquired for one of the three regions 152A, 152B, and 152C (also seen in FIG. 15).

In step 282, it is determined whether an average value of the image data of G acquired in the aforementioned step 280 is smaller than a predetermined lower limit value. When the average value is smaller (that is, when the decision of step 282 is made affirmative), the process proceeds to step 284, in which the charge accumulation time DT is reset to be made twice. Subsequently, the process returns to the aforementioned step 280. When the average value is not smaller (that is, when the decision of step 282 is made negative), the process proceeds to step 286.

In step 286, it is determined whether the average value of image data of G acquired in the aforementioned step 280 is greater than a predetermined upper limit value. When the average value is greater (that is, when the decision of step 286 is made affirmative), the process proceeds to step 288, in which the charge accumulation time DT is reset to be a half value. Subsequently, the process returns to the aforementioned step 280. When the average value is not greater (that is, when the decision of step 286 is made negative), the process proceeds to step 290.

Namely, due to the operation of steps 280 to 288 being executed repeatedly, the charge accumulation time DT is adjusted so that the average value of image data of G is set to become a value within the range between the aforementioned lower limit value and the aforementioned upper limit value. In the present embodiment, the aforementioned lower limit value is a value of image data corresponding to 50% of a saturation output level of the line CCD 16 and the upper limit value is a value of image data corresponding to 80% of a saturation output level of the line CCD 116.

In step 290, based on the charge accumulation time DT at this point in time, the target value GM of image data, and the average value GT of image data at this point in time, a provisional target charge accumulation time DM is calculated by the following expression (9) and is stored in a predetermined region of the RAM 68.

$$DM = DT \times GM \div GT \qquad (9)$$

In step 292, it is determined whether the operation of the aforementioned steps 278 to 290 is completed for all of the regions 152A, 152B, and 152C. When it is not completed, the process returns to step 278 and the operation of steps 278 to 290 is performed for each of remaining regions. As a result, the provisional target charge accumulation time DM is obtained for each of all the regions 152A, 152B, and 152C.

In the subsequent step 294, based on the respective provisional target accumulation time DM for the regions 152A, 152B, and 152C, which are obtained by the aforementioned operation, an overall target charge accumulation time of the line CCD 116 is derived and is stored in the predetermined region of the RAM 68. Meanwhile, as the above-described overall target charge accumulation time in the present embodiment, the shortest one of the three provisional target charge accumulation time DM is applied. As a result, the output level of the line CCD 116 can be set so as not to exceed the saturation output level in all the three regions 152A, 152B, and 152C.

In step 296, an instruction for conveying the photographic film 22 at a high speed (in the present embodiment, 5×v) is given to the film carrier 38 and the photographic film 22 is thereby discharged from the film carrier 38 at the high speed. Subsequently, the CCD output adjustment processing ends.

The overall target charge accumulation time obtained by the aforementioned CCD output adjustment processing is set as a charge accumulation time of the line CCD 116 in image reading processing, which will be described below.

Figure 22:
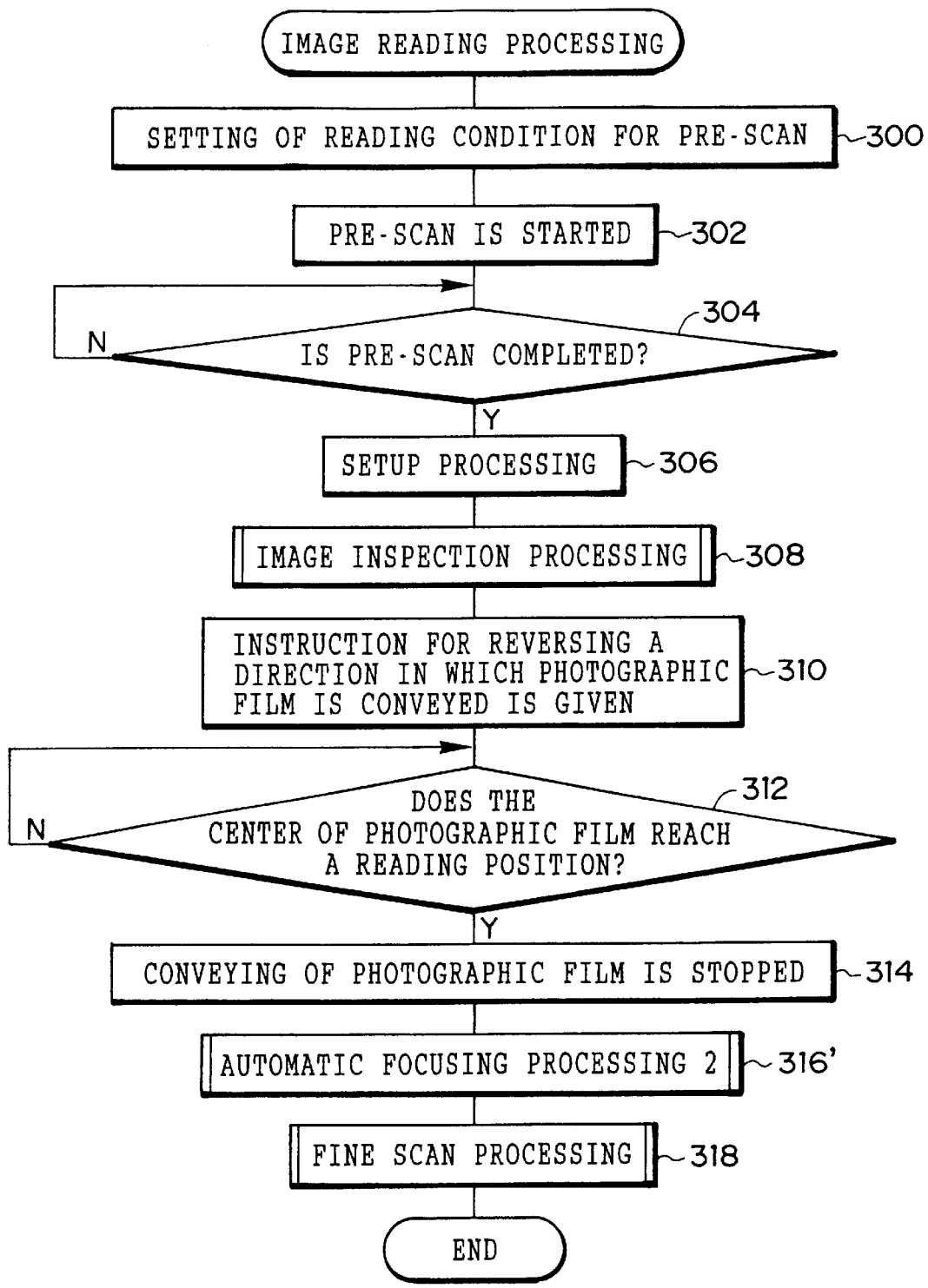
FIG. 22 is a flow chart of image reading processing which is executed by the microprocessor of the line CCD scanner in the second embodiment.

Next, image reading processing in the image reading apparatus according to the second embodiment will be described with reference to FIG. 22. It should be noted that, in FIG. 22, steps having the same operations as those of FIG. 11 (the image reading processing in the first embodiment) will be denoted by the same step numbers, and a description thereof will be omitted.

As shown in this figure, the image reading processing of the image reading apparatus according to the second embodiment is different from that in the first embodiment only in that the automatic focusing processing of step 316 shown in FIG. 11 is changed to automatic focusing processing 2 in which, in a case in which focusing control is performed, when a predetermined condition that focusing can be considered to have been made is not satisfied, a condition related to focusing control is altered and focusing control is performed again.

Figure 23A:
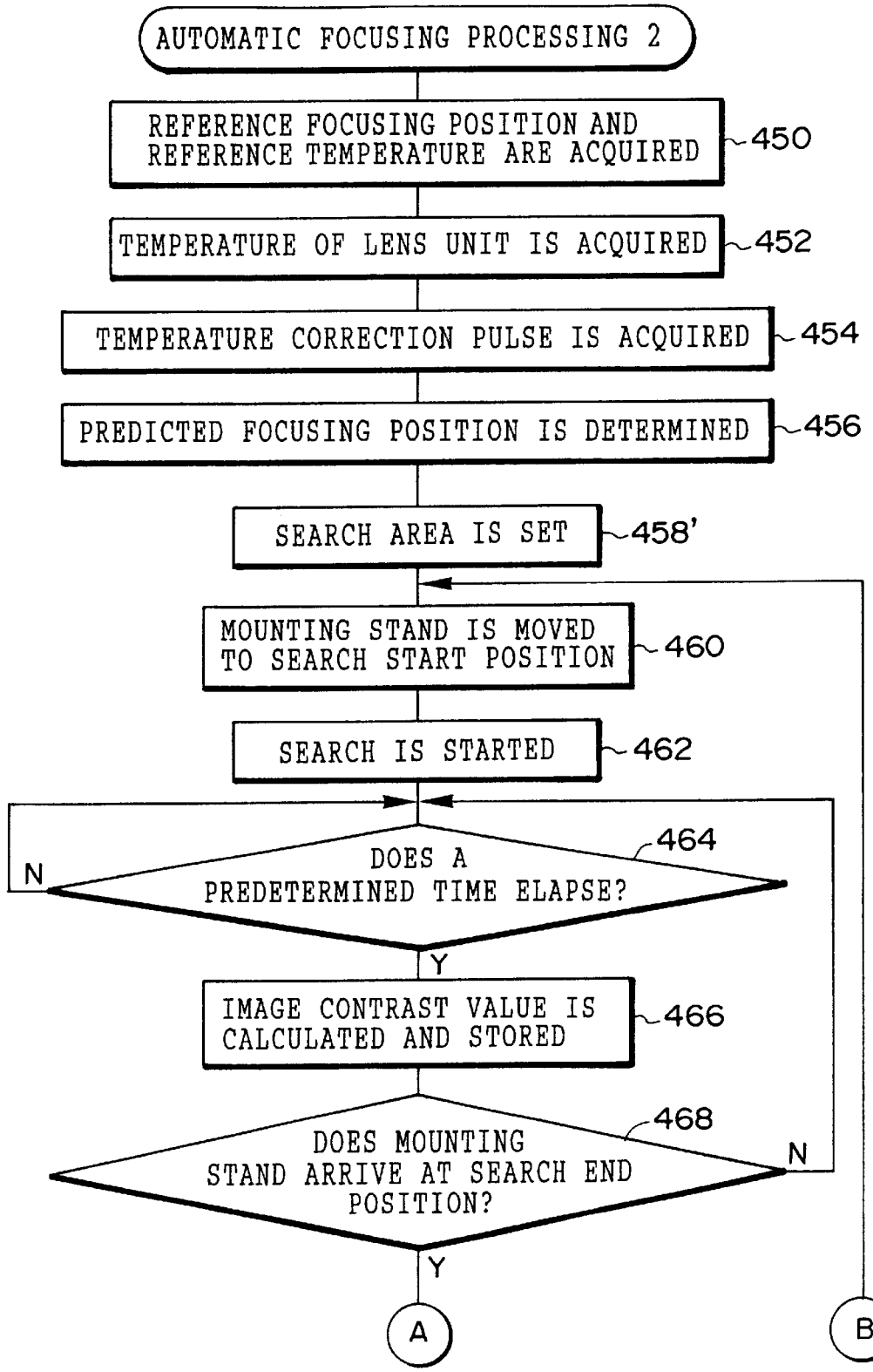
FIGS. 23A and 23B are a flow chart of automatic focusing processing 2 which is executed in the middle of the image reading processing shown in FIG. 22.
Figure 23B:
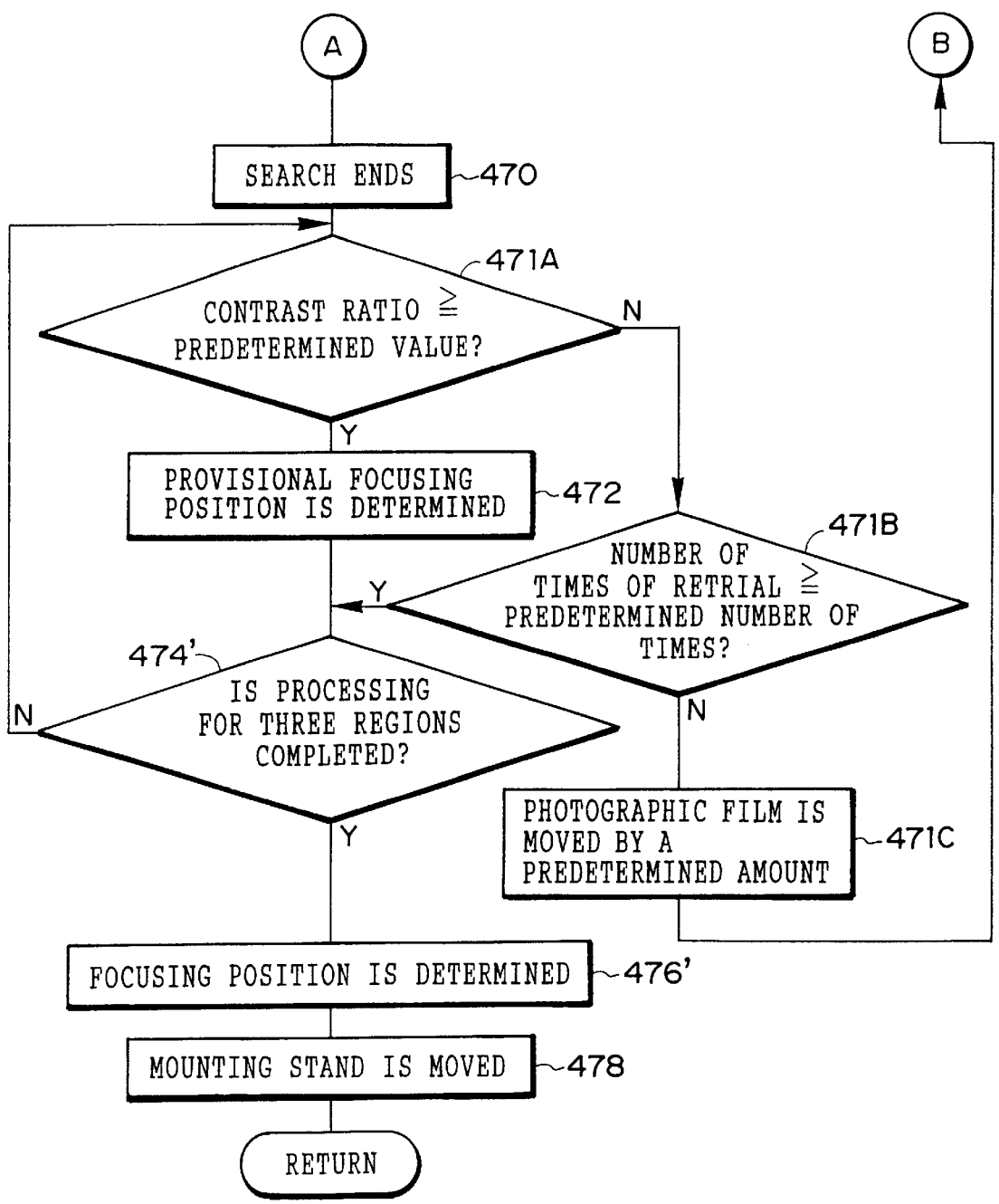

Next, the automatic focusing processing 2 according to the second embodiment will be described with reference to FIG. 23. It should be noted that, in FIG. 23, steps having the same operations as those of FIG. 13 (the automatic focusing processing according to the first embodiment) will be denoted by the same step numbers, and a description thereof will be omitted.

As shown in this figure, the automatic focusing processing 2 in the second embodiment is different from the automatic focusing processing in the above-described first embodiment in that: the search area setting processing of step 458 is changed to step 458' in which an area including three regions of 152A, 152B, and 152C shown in FIG. 15 is set as the search area; directly after execution of the search end processing of step 470, respective operations of steps 471A, 471B, and 471C are executed; when the decision of step 474 is made negative, the process returns to step 471A; and the focusing position determination processing of step 476 is changed to step 476' in which a procedure for determining the focusing position is changed in accordance with the number of determined provisional focusing positions.

Namely, in the automatic focusing processing 2 in the second embodiment, in step 458', the area including the three regions 152A, 152B, and 152C shown in FIG. 15 is set as the search area. Therefore, in the operation of step 460 to step 470, image contrast values (moving mean values) at a plurality of locations (in the present embodiment, six locations) in the search area for each of the regions 152A, 152B, and 152C are calculated and stored.

Subsequently, when search in the search area set in the aforementioned step 458' ends by the operation to step 470, the process proceeds to step 471A, in which in one of the regions 152A, 152B, and 152C, the ratio of a maximum value to a minimum value in a plurality of image contrast values in a search area, which image contrast values have already been obtained (the ratio is hereinafter referred to as a contrast ratio), is calculated, and it is determined whether the contrast ratio is greater than or equal to a predetermined value (in the present embodiment, 1.5). When it is not greater than or equal to the predetermined value (that is, when the decision of step 471A is made negative), the process proceeds to step 471B, in which it is determined whether the number of repetition of the operation of steps 460 to 470 (that is, the number of times of retrial) is a predetermined number of times (in the present embodiment, 5) or more. When it is less than the predetermined number of times (that is, when the decision of step 471B is made negative), the process proceeds to step 471C, in which the photographic film 22 is moved in a sub-scan direction by a predetermined amount (in the present embodiment, one tenth a widthwise dimension of the photographic film in the sub-scan direction), and thereafter, the process returns to step 460. When it is the predetermined number of times or more (that is, when the decision of step 471B is made affirmative), the process proceeds to step 474'.

On the other hand, in the above-described step 471A, when it is determined that the contrast ratio is the predetermined value or more (that is, the decision of step 471A is made affirmative), the process proceeds to step 472.

Namely, when, in one of the regions 152A, 152B, and 152C, the contrast ratio in the search area set in the above-described step 458' is less than the predetermined value, it is determined that focusing cannot be made (that is, the focusing position cannot be determined), and determination of the contrast ratio is made again with the photographic film being moved in the sub-scan direction by the predetermined amount. By repeating this operation, with the aforementioned predetermined number of times being set at an upper limit, until the contrast ratio becomes the predetermined value or more, in step 472, a provisional focusing position for an image whose contrast ratio is the aforementioned predetermined value or more can be determined. Here, when the number of times of retrial comes to the predetermined number of times, focusing control is abandoned and the process proceeds to step 474' without making any determination about the provisional focusing position in the above-described step 472.

In step 474', it is determined whether the operation of step 471A to step 472 is completed for each of all the regions 152A, 152B, and 152C. When the operation is not completed (when the decision of step 474' is made negative), the process returns to step 471A, in which the operation of step 471A to step 472 is effected for each of unprocessed regions, and when the operation is all completed (when the decision of step 474' is made affirmative), the process proceeds to step 476'.

Accordingly, in the automatic focusing processing 2 of the second embodiment as well, the provisional focusing position cannot necessarily be determined for each of all the three regions 152A, 152B, and 152C. Therefore, in the focusing position determination processing of step 476' in the present embodiment, the focusing position is determined in accordance with the number of determined provisional focusing positions in such a way as described below.

Figure 14:
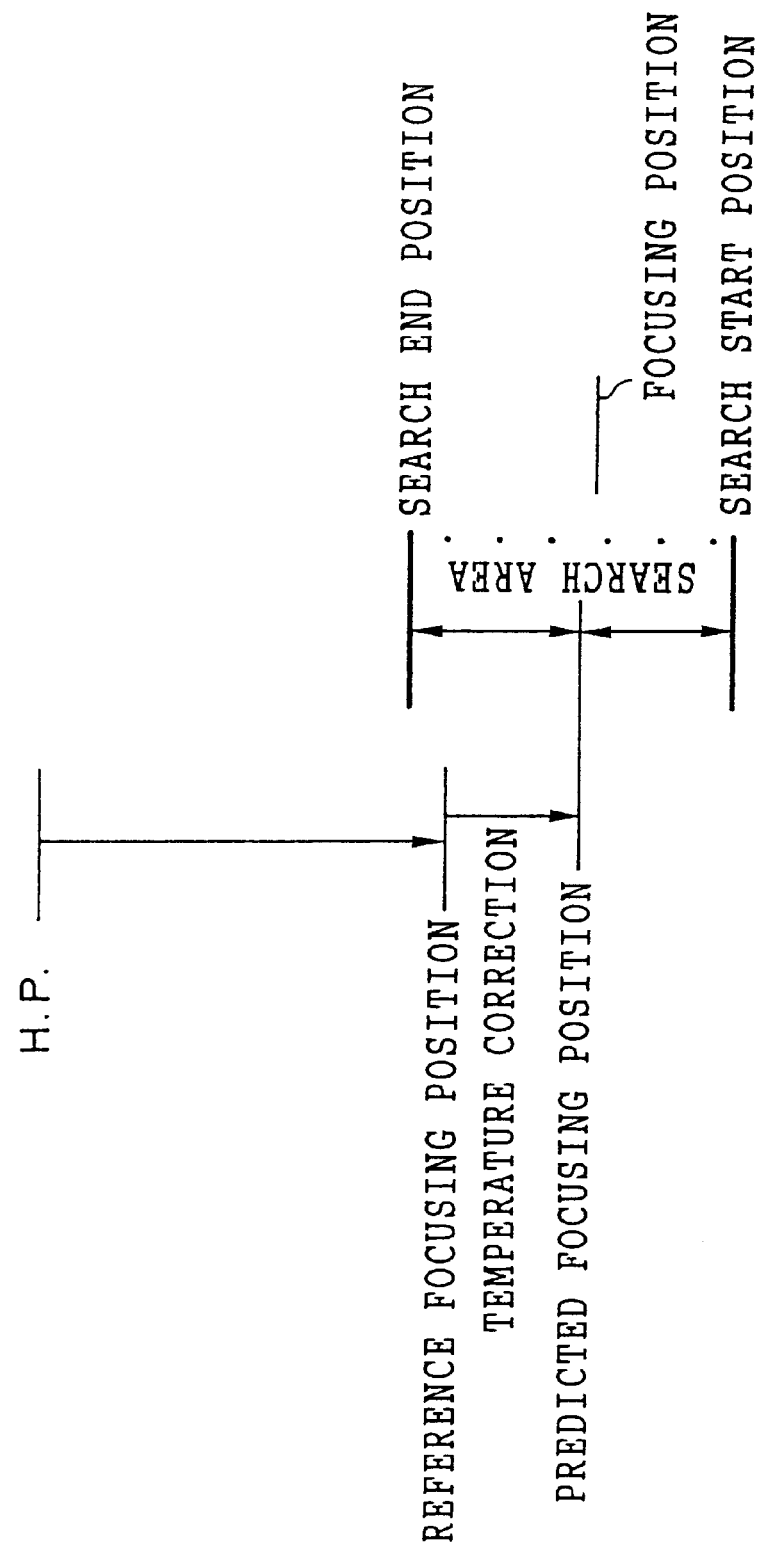
FIG. 14 is a diagram which shows a reference focusing position, a predicted focusing position, a search area, and a focusing position with respect to an original point (H.P.).

Namely, when three provisional focusing positions are determined, an arithmetic mean position of the maximum and minimum provisional focusing positions among the three provisional focusing positions is determined as the focusing position. When two provisional focusing positions are determined, an arithmetic mean positions of the two positions is determined as the focusing position. When one provisional focusing position is determined, it is determined as the focusing position. Further, no provisional focusing position is determined, the predicted focusing position show FIG. 14 is determined as the focusing position. The methods of the determination mentioned above are summarized in Table 2.

TABLE 2

| Number of determined provisional focusing positions | Overall focusing position |
|---|---|
| 3 | Arithmetic mean value of maximum and minimum provisional focusing positions |
| 2 | Arithmetic mean value of provisional focusing positions |
| 1 | Determined provisional focusing position |
| 0 | Predicted focusing position |

As described above in detail, the image reading apparatus according to the second embodiment can achieve the same effects as those of the image reading apparatus according to the first embodiment. Further, in performing focusing control for a plurality of regions of an image, when a predetermined condition that focusing can be considered to have been made is not satisfied, a condition related to focusing control is altered and focusing control is performed again. Accordingly, it is possible to detect a more accurate focusing position and thereby set a more suitable focused state.

Further, in the image reading apparatus according to the second embodiment, prior to the focusing control for a plurality of regions of an image, an output level of the line CCD is adjusted. Accordingly, it is possible to cope with the case that a false peak occurs or a desired image contrast value cannot be obtained.

In the second embodiment, there was described a case in which, in the CCD output adjustment processing shown in FIG. 21, the charge accumulation time of the line CCD 116 is adjusted so as to adjust the output level of thee line CCD 116. However, the present invention is not limited to the same, and a mode in which the output level of the line CCD 116 is adjusted by adjusting the diaphragm 39 provided in the light source portion 30 may be applied.

Further, in the second embodiment, there was described a case in which the predetermined condition that focusing can be considered to have been made is set such that the contrast ratio is a predetermined value or more, but the present invention is not limited to the same. For example, there may be applied a mode in which a position corresponding to the maximum value among image contrast values at a plurality of locations in the search area, which image contrast values are obtained in the operation to step 470 shown in FIG. 23, is not located at any end portion of the aforementioned plurality of locations.

Figure 24:
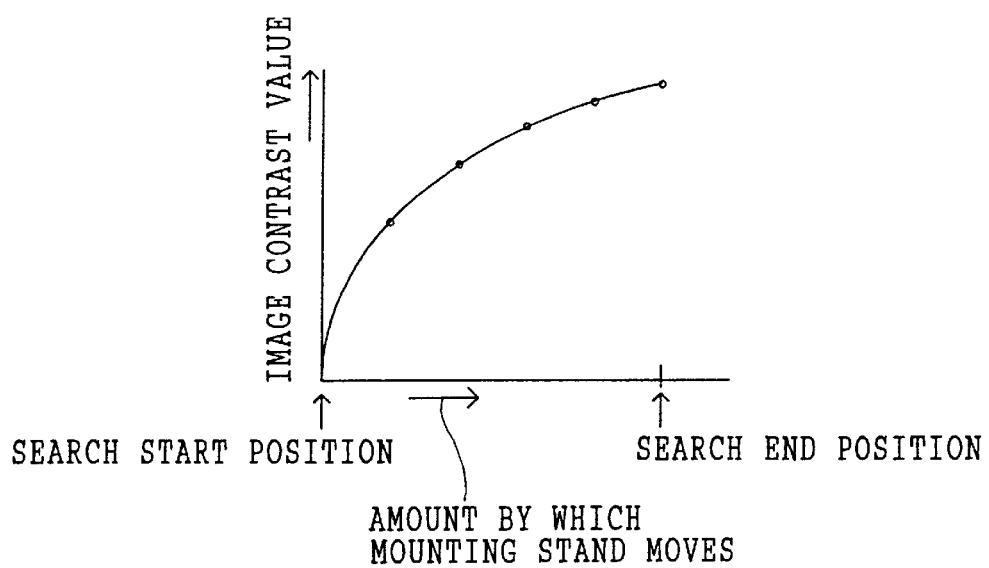
FIG. 24 is a diagram for illustrating another example of the second embodiment, which is a graph showing variations in an image contrast value, which is caused by movement of a standing stand.

Namely, when the position corresponding to the maximum value of the image contrast values at the plurality of locations is located at an end portion of the aforementioned plurality of locations, as shown in FIG. 24, the maximum value is a maximum value only in the search area, and there is a high possibility that a position having the maximum image contrast value is located in a region outside the search area, that is, at a right-handed side separated from the search end position on the paper of FIG. 24.

Accordingly, in this case, it is preferable that the search area be shifted toward the maximum value of the image contrast value, or by the search area being widened, retrial of the operation with the widened search area widened be performed.

Further, in the second embodiment, there was described a case in which when no provisional focusing position is determined, the predicted focusing position is used as the focusing position. However, the present invention is not limited to the same, and a method in which, when no provisional focusing position is determined, the automatic focusing processing 2 is temporarily interrupted, and an operator is required to make a determination as to the process should proceed to the subsequent processing (that is, fine scan processing) by that a message, which indicates no provisional focusing position being determined is displayed on the display 18, may be applied.

Moreover, in each of the above-described embodiments, no particular mention is made on the color used by the line CCD 116 when the automatic focusing processing using image contrast is performed, but it is preferable that image contrast of green be employed by reason that, generally, image contrast of green is highest. Table 3 indicates colors suitably used at the time of performing automatic focusing for various types of image sensors.

TABLE 3

| Kinds of image sensor | Color used during automatic focusing |
|---|---|
| 3-line color sensor (irradiation of white color light) | Only G-sensor used |
| 3-plate area sensor (irradiation of white color light) | Only G-sensor used |

TABLE 3-continued

| Kinds of image sensor | Color used during automatic focusing |
| --- | --- |
| Single plate area sensor color-switchable irradiation) | (3-Irradiation of G-light) |
| Single plate color area sensor (irradiation of white color light) | Only G-pixels used |

In this case, when image contrast of G is low, retrial of focusing control with the color (G) being changed to other color may be conducted.

Further, in each of the above-described embodiments, there was described a case in which the position in the sub-scan direction, which is to be subjected to focusing control during automatic focusing processing is set at the central position of the photographic film in the sub-scan direction, but the present invention is not limited to the same, and there may be applied a mode in which a position in a sub-scan direction which is suitable for focusing control is determined at pre-scan (see steps 302 and 304 shown in FIGS. 11 and 22), and focusing control is performed for the position in the sub-scan direction, which is suitable for the above-described focusing control during automatic focusing processing. An example of this mode will be described below.

Figure 25:
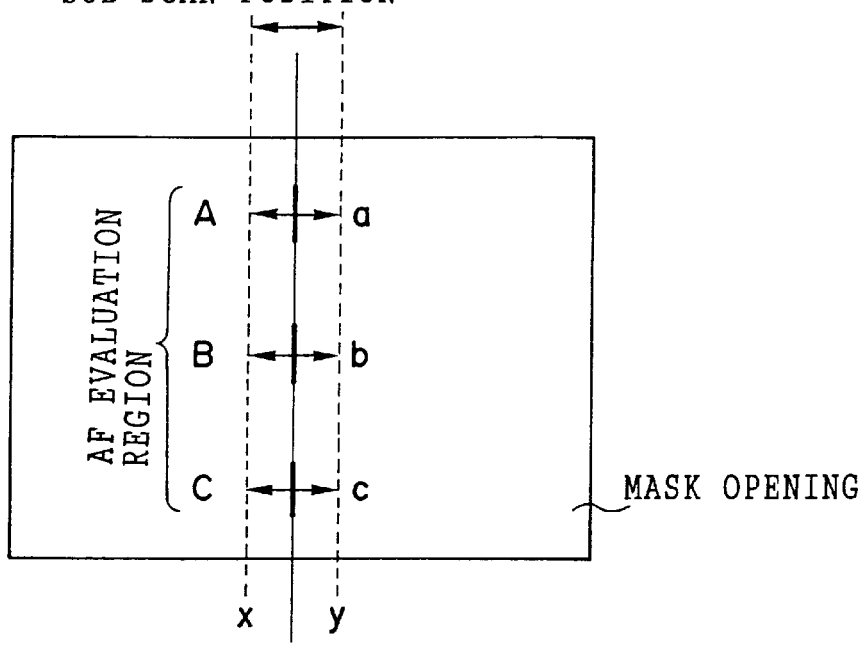
FIG. 25 is a diagram for illustrating an example different from the first and second embodiments, which schematically shows a positional relationship between a region for determination of a sub-scan position with respect to an open position of a film carrier, and an automatic-focusing evaluation region.

In this case, for example, the desired sub-scan-direction position of the focusing control is located in the vicinity of the center of an opening formed in the film carrier, and therefore, as shown in FIG. 25, with a predetermined region near the center of the opening being set as a region to be determined as the sub-scan-direction position (hereinafter referred to as a region for determination of a sub-scan position), image data of the region for determination of a sub-scan position is obtained.

Namely, as shown in FIG. 25, in a case in which, with three regions A, B, and C being each set as a region in which image contrast is determined in the automatic focusing processing (hereinafter referred to as an AF evaluation region) and with pixels a, b, and c being each set as a central pixel in a main scan direction in each AF evaluation region, image data to be determined is obtained by a sensor of green (G) in the line CCD 116, image data of green in the region for determination of respective sub-scan positions of the central pixels a, b, and c is obtained.

Figure 26:
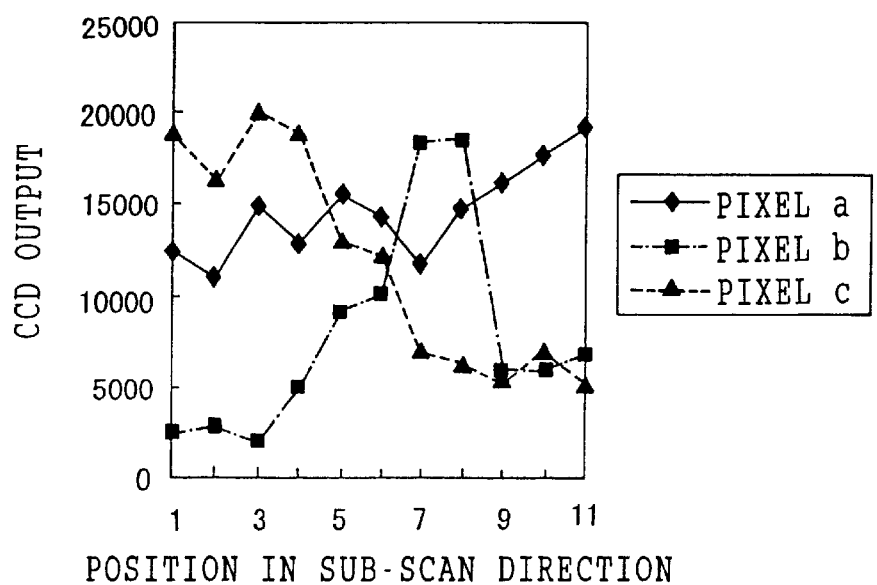
FIG. 26 is a diagram for illustrating a form which is different from the first and second embodiments, which is a graph showing an example of a relation between a position in a sub-scan direction and an output level of a line CCD.
Figure 28A:
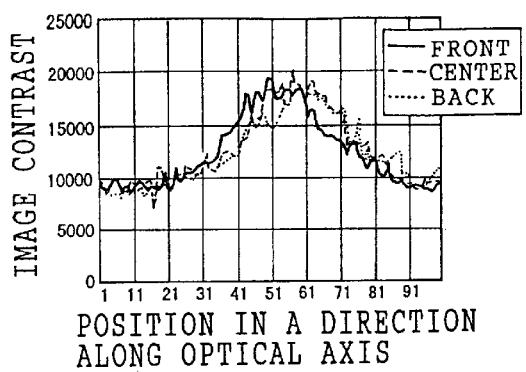
FIGS. 28A to 28F are diagrams for illustrating problems of conventional arts, which are graphs each showing a result of actual measurement of an image contrast value to a position of image-formation means in a direction along an optical axis in a negative film in 135 magazines.
Figure 28B:
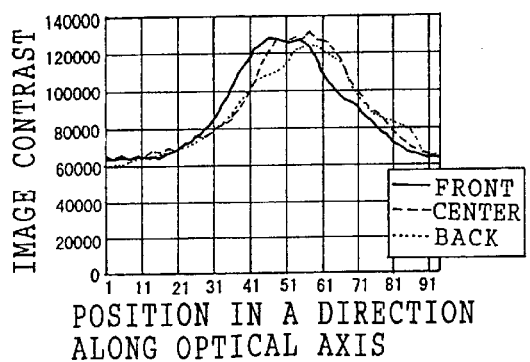
Figure 28C:
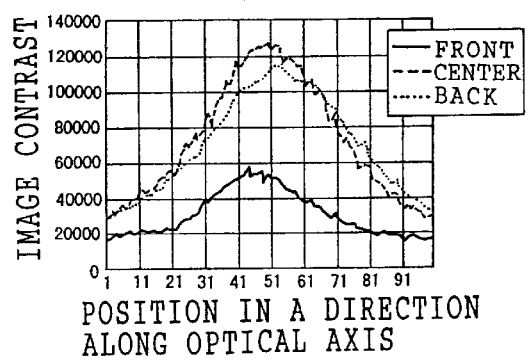
Figure 28D:
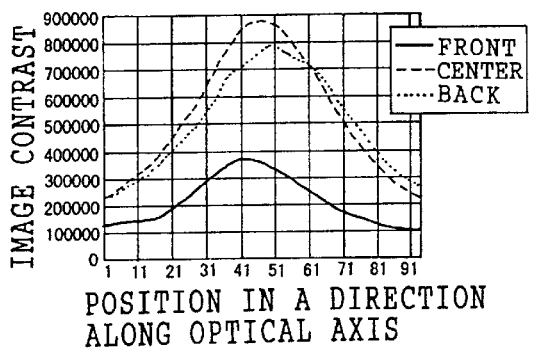
Figure 28E:
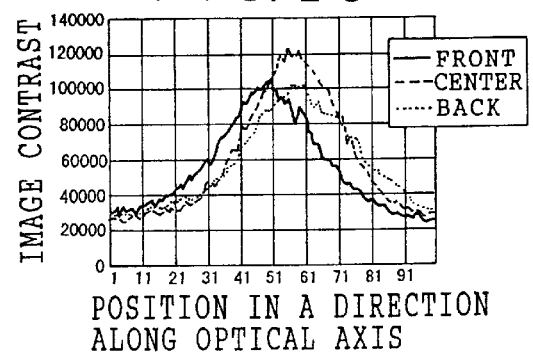
Figure 28F:
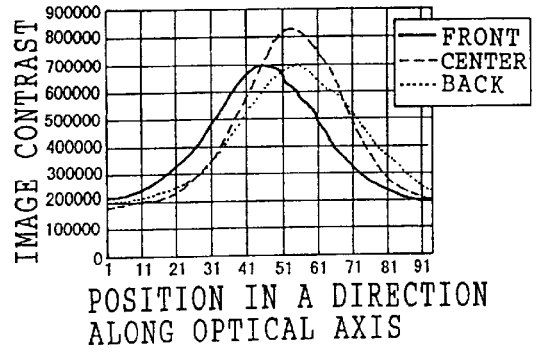
Figure 29A:
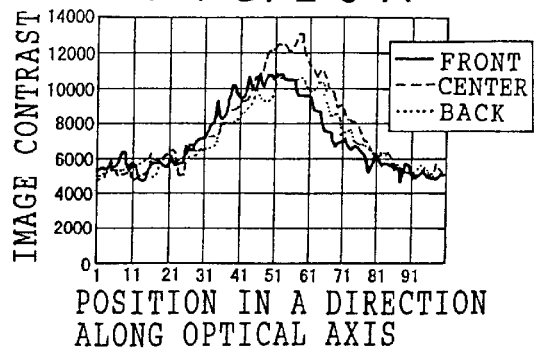
FIGS. 29A to 29H are diagrams for illustrating problems of conventional arts, which are graphs each showing a result of actual measurement of an image contrast value to a position of image-formation means in a direction along an optical axis in a reversal film in 135 magazines.
Figure 29B:
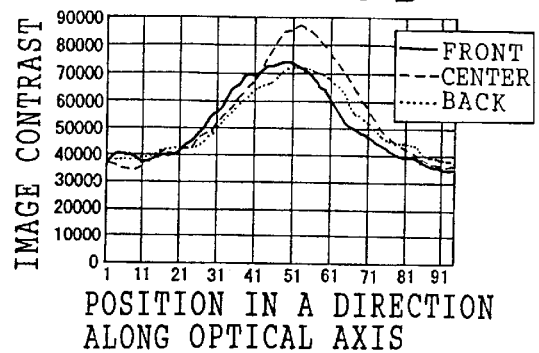
Figure 29C:
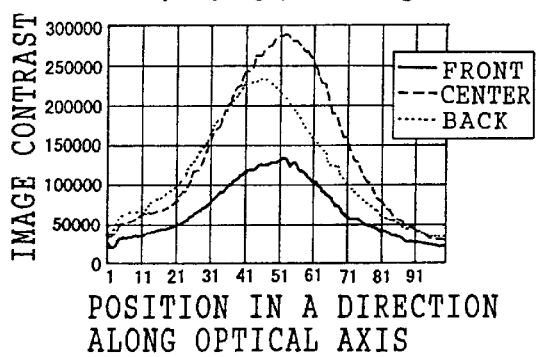
Figure 29D:
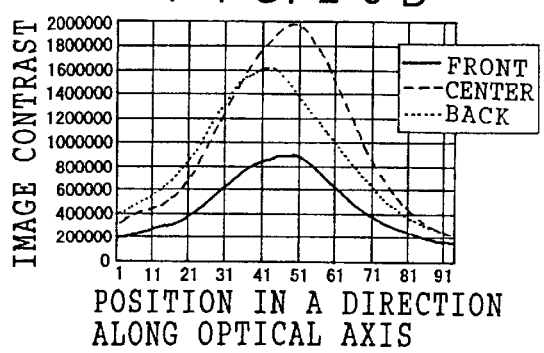
Figure 29E:
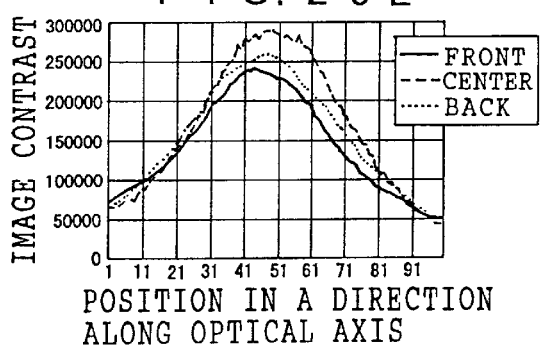
Figure 29F:
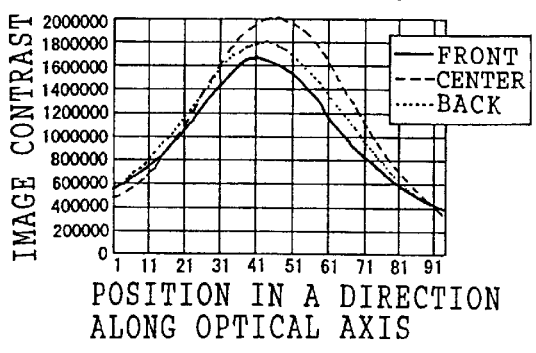
Figure 29G:
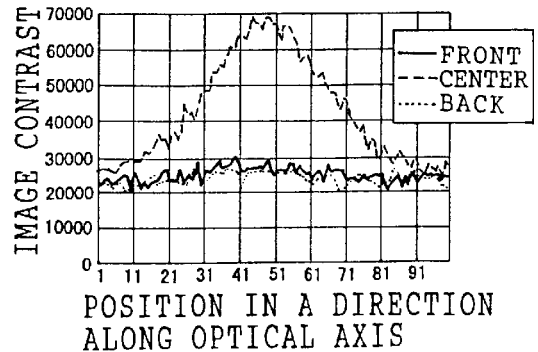
Figure 29H:
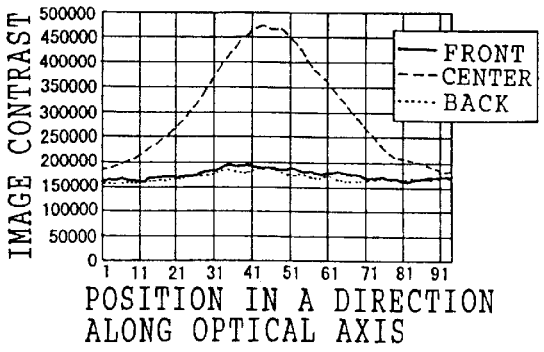

FIG. 26 shows an example of distribution of the acquired image data (CCD outputs) corresponding to the respective central pixels a, b, and c with respect to positions in the sub-scan direction.

Subsequently, it is determined as to which position in the sub-scan direction is suitable for focusing control sequentially in the sub-scan direction. In this case, the determination is made based on the following criteria:

(1) a position to be determined is located near an ideal position (that is, the center of an opening formed in the film carrier);
(2) image data of each central pixel is in a proper range, for example, in a range of 10 to 80% of CCD saturation output of the line CCD 116; and
(3) there is no extremely large difference between respective image data of the central pixels.

By making a search for positions in the sub-scan direction, which positions satisfy these conditions as far as possible, focusing control is performed for sub-scan-direction positions obtained as the result of the search.

As shown in FIG. 26, the sub-scan-direction positions 5 or 6 can be considered as that suitable for focusing control.

In each of the above-described embodiments, there was described a case in which the line CCD 116 is applied as the image sensor of the present invention, but the present invention is not limited to the same. For example, an area CCD may be applied, or a photoelectric element other than CCD may also be applied.

Further, in each of the above-described embodiments, there was described a case in which a virtual focusing position is obtained for each of three regions. However, the present invention is not limited to the same, and a virtual focusing position may also be obtained for each of a plurality of regions, that is, four or more regions.

Moreover, in the first embodiment, there was described a case in which during the automatic focusing processing, a virtual focusing position is detected by moving the mounting stand 47 for each of three regions. However, the present invention is not limited to the same, and a method in which a search area is set as a region including three virtual focusing positions in the same way as in the second embodiment and the three virtual focusing positions are all detected at one detecting operation (moving operation of the mounting stand 47) may also be applied. In this case, as compared with the first embodiment, a processing time for the automatic focusing processing can be considerably shortened.

In each of the above-described embodiments, there was described a case in which, based on a focus calibration table obtained in advance by focus calibration processing, a reference focusing position during the automatic focusing processing is set. However, the present invention is not limited to the same, and a method in which a search area during automatic focusing is obtained in advance by an experiment or the like without performing focus calibration processing and a focusing position is detected within the search area may also be applied.

Further, in each of the above-described embodiments, the present invention is applied to the case in which the film carrier 38 for a slide is used during the image reading processing, but it is not limited to the same. The present invention may also be applied to a case in which a film carrier for an elongated photographic film is used. In this case, in the same way as in each of the embodiments, even if a photographic film to be read is curved in the main scan direction, a suitable focusing position can be set easily and in a short time.

Moreover, in each of the above-described embodiments, there was described a case in which in the focusing position search processing shown in FIG. 9 and in the automatic focusing processing shown in FIG. 13, a position having the maximum image contrast value among a plurality of positions within the search area is set as a focusing position (that is, a virtual focusing position), but the present invention is not limited to the same. For example, a central position between two positions having the maximum image contrast values among the plurality of positions may also be set as a focusing position (that is, a virtual focusing position).

Still further, in each of the above-described embodiments, there was described a case in which a position at which temperature correction is made for a reference focusing position is set as a predicted focusing position. However, the present invention is not limited to the same, and the reference focusing position may be directly set as the predicted focusing position without making temperature correction. However, in this case, it is necessary to set the search area to be a little larger than that of each of the embodiments by considering variation caused by the temperature of the focusing position, and when other conditions than the aforementioned are the same as those of the embodiments, a search time becomes longer as compared with the above-described present embodiments.

In each of the above-described embodiments, there was described a case in which the temperature correction table shown in FIG. 16 is stored in advance. However, the present invention is not limited to the same, and the temperature correction pulse number may be obtained by calculation. The following expression (10) is an example of a mathematical expression for the aforementioned calculation.

$$CP = 4 \times (T_0 - T)/MO \qquad (10)$$

wherein, CP indicates a temperature correction pulse number, To indicates a temperature during focus calibration, T indicates a temperature during automatic focusing, and MO indicates a magnification.

Further, in each of the above-described present embodiments, there was described a case in which focusing is performed by an image contrast approach. However, the present invention is not limited to the same, and focusing may also be performed based on a distance detected by a distance sensor, in place of data of a film image, which distance sensor measures a distance between the photographic film and the lens unit 50 (or the line CCD 116) using infrared radiation or the like.

Moreover, in each of the above-described present embodiment, there was described a case in which a negative film is used as the photographic film 22, but the present invention is not limited to the same. The present invention can be applied to a case of reading a reversal film (that is, a positive film).

Figure 30:
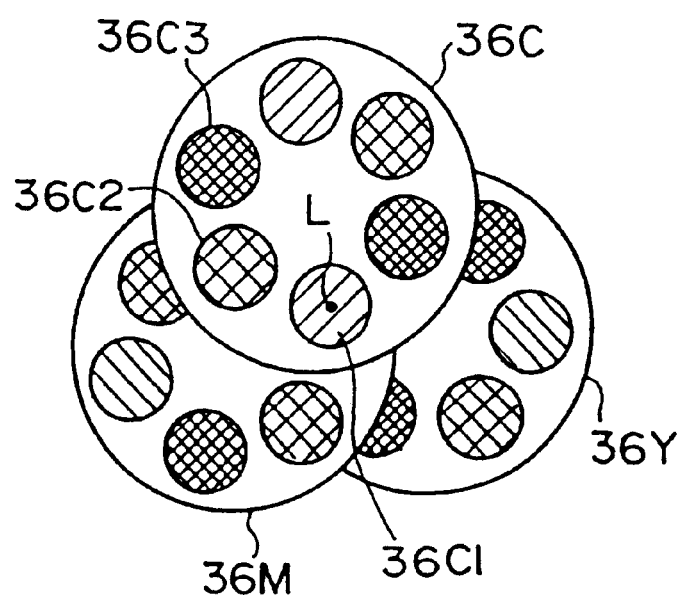
FIG. 30 is a plan view which shows a modified example of a turret.

Still further, the present invention is not limited to the above-described turret (see FIG. 4B). As shown in FIG. 30, a turret 36C for cyan filters which absorb red light, a turret 36M for magenta filters which absorb green light, and a turret 36Y for yellow filters which absorb violet light may be used. The turret 36C includes a plurality of cyan filters 36C1, 36C2, and 36C3 having different densities, which are embedded therein. Meanwhile, the respective densities of the cyan filters 36C1, 36C2, and 36C3 are set so as to become higher in that order. Other turrets 36M and 36Y are also each structured in the same manner as the turret 36C. These turrets 36C, 36M, and 36Y are supported in a rotatable manner so that respective selected filters of the turrets overlap together on the optical axis.

What is claimed is:

1. An image reading apparatus comprising:
   a light source which illuminates an original to be read, on which an image is recorded;
   image-formation means which allows one of light transmitted through the original to be read or light reflected by the original to be read, to form an image;
   an image sensor which reads the image recorded on the original to be read and outputs read image as image data;
   moving means for moving at least one of at least a portion of said image-formation means, said image sensor, and the original to be read in a direction along an optical axis of said image-formation means; and
   control means which, based on a plurality of focusing positions of a plurality of regions of the image obtained by controlling said moving means so that focusing control which allows a position where an image is formed by said image-formation means and a position of said image sensor to coincide with each other is effected for the plurality of regions of the image, obtains a final focusing position for the image, and which controls said moving means so that at least one of at least a portion of said image-formation means, said image sensor, and the original to be read moves to a position based on the final focusing position.

2. An image reading apparatus according to claim 1, wherein in order that a region of a main subject recorded on the image be included in a range of the depth of field of said image-formation means when said control means controls said moving means so that at least one of at least a portion of said image-formation means, said image sensor, and the original to be read moves to the position based on the final focusing position, said control means obtains the final focusing position based on the plurality of focusing positions and the depth of field.

3. An image reading apparatus according to claim 2, wherein the image-formation means comprises a zoom lens.

4. An image reading apparatus according to claim 2, wherein the control means controls said moving means by varying the distance between the image-formation means and the original to be read and maintaining fixed the distance between the image sensor and the image-formation means.

5. An image reading apparatus according to claim 1, wherein said control means obtains the plurality of focusing positions based on a smoothed value of respective image contrast values at a plurality of positions in the plurality of regions.

6. An image reading apparatus according to claim 5, wherein the smoothed value is a moving average value of the respective image contrast values.

7. An image reading apparatus according to claim 1, wherein in performing focusing control for the plurality of regions of the image, when a predetermined condition indicating that focusing is complete is not satisfied, said control means changes a condition related to the focusing control and performs again the focusing control.

8. An image reading apparatus according to claim 1, wherein the plurality of regions of the image comprise non-contiguous image regions.

9. An image reading apparatus according to claim 8, wherein the plurality of regions of the image comprise non-contiguous image regions of a single main subject and comprise a central region of the main subject and at least one portion disposed near an edge portion of the main subject to effect focus adjustment for warping along a main scan direction of the original.

10. An image reading method according to claim 9, wherein the plurality of regions of the image comprise non-contiguous image regions of a single main subject and comprise a central region of the main subject and at least one portion disposed near an edge portion of the main subject to effect focus adjustment for warping along a main scan direction of the original.

11. An image reading apparatus according to claim 1, wherein prior to the focusing control for the plurality of regions of the image, said control means adjusts an output level of said image sensor.

12. A focusing control method in which focusing control which allows a position where an image is formed by image-formation means, the image-formation means causing one of light transmitted through an original to be read or light reflected by the original to be read so as to form the image, and a position of an image sensor, the image sensor reading an image recorded on the original to be read and outputting read image as image data, to coincide with each other is performed for a plurality of regions of the image recorded on the original to be read, by moving at least one of at least a portion of the image-formation means, the image sensor, and the original to be read in a direction along an optical axis of said image-formation means to obtain a plurality of focusing positions of the plurality of regions of the image, wherein based on the plurality of focusing positions obtained by the focusing control, a final focusing position for the image is obtained; and at least one of at least the portion of the image-formation means, the image sensor, and the original to be read is controlled so as to be moved to a position based on the final focusing position.

13. A focusing control method according to claim 12, wherein prior to the focusing control for the plurality of regions of the image, an output level of said image sensor is adjusted.

14. A focusing control method according to claim 12, wherein in performing focusing control for the plurality of regions of the image, when a predetermined condition indicating that focusing is complete is not satisfied, a condition related to focusing control is altered and focusing control is performed again.

15. A focusing control method according to claim 12, wherein the plurality of regions of the image comprise non-contiguous image regions.

16. A focusing control method according to claims 12, wherein in order that a region of a main subject recorded on the image be included in a range of a depth of field of the image-formation means when at least one of the at least the portion of the image-formation means, the image sensor, and the original to be read is controlled so as to be moved to the position based on the final focusing position, the final focusing position is obtained based on the plurality of focusing positions and the depth of field.

17. An focusing control method according to claim 16, wherein the distance between the image-formation means and the original to be read is varied and the distance between the image sensor and the image-formation means is fixed.

18. A focusing control method according to claim 12, wherein the plurality of focusing positions are obtained based on a smoothed value of image contrast values at a plurality of positions in the plurality of regions.

19. A focusing control method according to claims 18, wherein the smoothed value is a moving average value of the image contrast values.

* * * * *